US011108072B2

(12) United States Patent
Palumbo et al.

(10) Patent No.: US 11,108,072 B2
(45) Date of Patent: Aug. 31, 2021

(54) PLANAR SOLID OXIDE FUEL UNIT CELL AND STACK

(71) Applicant: Upstart Power, Inc., Southborough, MA (US)

(72) Inventors: Nathan Palumbo, West Boylston, MA (US); Joshua E Persky, Sutton, MA (US)

(73) Assignee: UPSTART POWER, INC., Southborough, MA (US)

( * ) Notice: Subject to any disclaimer, the term of this patent is extended or adjusted under 35 U.S.C. 154(b) by 305 days.

(21) Appl. No.: 16/324,338

(22) PCT Filed: Aug. 10, 2017

(86) PCT No.: PCT/US2017/046246
§ 371 (c)(1),
(2) Date: Feb. 8, 2019

(87) PCT Pub. No.: WO2018/031742
PCT Pub. Date: Feb. 15, 2018

(65) Prior Publication Data
US 2019/0181482 A1    Jun. 13, 2019

Related U.S. Application Data

(60) Provisional application No. 62/373,420, filed on Aug. 11, 2016.

(51) Int. Cl.
*H01M 8/10* (2016.01)
*H01M 8/1226* (2016.01)
(Continued)

(52) U.S. Cl.
CPC ......... *H01M 8/1226* (2013.01); *H01M 8/10* (2013.01); *H01M 8/12* (2013.01); *H01M 8/1213* (2013.01);
(Continued)

(58) Field of Classification Search
CPC ........ H01M 8/1226; H01M 8/10; H01M 8/12; H01M 8/1213; H01M 8/1233; H01M 8/1246; H01M 8/242; H01M 2008/1293
See application file for complete search history.

(56) References Cited

U.S. PATENT DOCUMENTS 3,162,411 A    12/1964  Duggan
3,224,187 A    12/1965  Breihan
(Continued)

FOREIGN PATENT DOCUMENTS

EP    1202366    8/2007
EP    1966850    9/2008
(Continued)

OTHER PUBLICATIONS

European Search Report for European Patent Application No. 17840258, dated Feb. 20, 2020, 9 pages.
(Continued)

*Primary Examiner* — Jane J Rhee
(74) *Attorney, Agent, or Firm* — Day Pitney LLP; George N. Chaclas

(57) ABSTRACT

A planar SOFC cell unit is formed from a plurality of planar elements (1100, 1200, 1300) stacked one above another. The cell unit encloses a cell chamber (1400) that includes a solid oxide fuel cell (2000) configured for electro-chemical energy generation, compliantly supported within the cell chamber. The plurality planar elements each comprise a thermally conductive material having a coefficient of thermal conductivity that is a least 100 W/mK such as aluminum or copper. The planar elements are thermally conductively coupled to each other to provide a continuous thermally conductive pathway that extends from perimeter edges of the cell chamber to perimeter edges of the plurality of planar (Continued)

elements. An SOFC stack comprises a plurality of the planar SOFC cell units stacked one above another.

17 Claims, 7 Drawing Sheets

(51) Int. Cl.
```
H01M 8/242      (2016.01)
H01M 8/12       (2016.01)
H01M 8/1213     (2016.01)
H01M 8/1233     (2016.01)
H01M 8/1246     (2016.01)
H01M 8/124      (2016.01)
```

(52) U.S. Cl.
CPC ....... *H01M 8/1233* (2013.01); *H01M 8/1246* (2013.01); *H01M 8/242* (2013.01); *H01M 2008/1293* (2013.01)

(56) References Cited

U.S. PATENT DOCUMENTS

| | | |
|---|---|---|
| 3,372,960 A | 3/1968 | Fisher |
| 4,656,689 A | 4/1987 | Dennis |
| 4,910,100 A | 3/1990 | Nakanishi et al. |
| 4,997,726 A | 3/1991 | Akiyama et al. |
| 5,169,730 A | 12/1992 | Reichner et al. |
| 5,415,233 A | 5/1995 | Roussakis et al. |
| 5,501,472 A | 3/1996 | Brancher et al. |
| 5,732,440 A | 3/1998 | Wright |
| 5,733,675 A | 3/1998 | Dederer et al. |
| 5,750,278 A | 5/1998 | Gillett et al. |
| 5,827,620 A | 10/1998 | Kendall |
| 6,221,522 B1 | 4/2001 | Zafred et al. |
| 6,265,092 B1 | 7/2001 | Meltser et al. |
| 6,306,531 B1 | 10/2001 | Clingerman et al. |
| 6,358,640 B1 | 3/2002 | Kendall et al. |
| 6,485,852 B1 | 11/2002 | Miller et al. |
| 6,492,050 B1 | 12/2002 | Sammes |
| 6,608,463 B1 | 8/2003 | Kelly et al. |
| 6,627,339 B2 | 9/2003 | Haltiner, Jr. |
| 6,696,187 B2 | 2/2004 | Kendall et al. |
| 6,824,907 B2 | 11/2004 | Sarkar et al. |
| 6,841,284 B2 | 1/2005 | Brown et al. |
| 7,001,682 B2 | 2/2006 | Haltiner, Jr. |
| 7,008,711 B2 | 3/2006 | Pondo et al. |
| 7,014,822 B1 | 3/2006 | Shinke et al. |
| 7,195,663 B2 | 3/2007 | Edlund et al. |
| 7,226,681 B2 | 6/2007 | Florence et al. |
| 7,235,321 B2 | 6/2007 | Sarkar et al. |
| 7,252,902 B2 | 8/2007 | Bram et al. |
| 7,256,516 B2 | 8/2007 | Buchanan et al. |
| 7,335,432 B2 | 2/2008 | Koripella |
| 7,349,959 B2 | 3/2008 | Imamura et al. |
| 7,419,060 B2 | 9/2008 | Arthur et al. |
| 7,422,810 B2 | 9/2008 | Venkataraman et al. |
| 7,425,381 B2 | 9/2008 | Gilman et al. |
| 7,452,622 B2 | 11/2008 | Sarkar et al. |
| 7,645,535 B2 | 1/2010 | Rehg et al. |
| 7,655,337 B2 | 2/2010 | Kaye |
| 7,674,543 B2 | 3/2010 | Chiang et al. |
| 7,767,329 B2 | 8/2010 | Crumm et al. |
| 7,875,403 B2 | 1/2011 | Finnerty |
| 7,887,959 B2 | 2/2011 | Gallet et al. |
| 7,943,263 B2 | 5/2011 | Brantley et al. |
| 8,026,011 B2 | 9/2011 | Ooshima et al. |
| 8,043,760 B2 | 10/2011 | Okamoto et al. |
| 8,071,251 B2 | 12/2011 | Eshraghi et al. |
| 8,163,433 B2 | 4/2012 | Zafred et al. |
| 8,178,256 B2 | 5/2012 | Ogawa et al. |
| 8,188,382 B2 | 5/2012 | Monden et al. |
| 8,197,249 B1 | 6/2012 | Nguyen |
| 8,197,976 B2 | 6/2012 | Poshusta et al. |
| 8,273,485 B2 | 9/2012 | Schaevitz et al. |
| 8,304,122 B2 | 11/2012 | Poshusta et al. |
| 8,343,684 B2 | 1/2013 | Devoe et al. |
| 8,377,604 B2 | 2/2013 | Nakajima et al. |
| 8,389,180 B2 | 3/2013 | Hawkes et al. |
| 8,530,114 B2 | 9/2013 | Kirkwood |
| 8,614,023 B2 | 12/2013 | Poshusta et al. |
| 8,628,891 B2 | 1/2014 | Brown et al. |
| 8,652,707 B2 | 2/2014 | Finnerty et al. |
| 8,658,327 B2 | 2/2014 | Mook et al. |
| 8,714,563 B2 | 5/2014 | Yamamoto et al. |
| 8,715,879 B2 | 5/2014 | Devoe et al. |
| 8,854,389 B2 | 10/2014 | Wong et al. |
| 8,890,474 B2 | 11/2014 | Kim et al. |
| 9,056,768 B2 | 6/2015 | Langan |
| 9,065,159 B2 | 6/2015 | Chan et al. |
| 9,105,917 B2 | 8/2015 | Kuehn et al. |
| 9,190,673 B2 | 11/2015 | Venkataraman et al. |
| 9,343,758 B2 | 5/2016 | Poshusta et al. |
| 9,452,475 B2 | 9/2016 | Armstrong et al. |
| 9,500,116 B2 | 11/2016 | Foos et al. |
| 9,550,364 B2 | 1/2017 | Wood et al. |
| 9,722,435 B2 | 8/2017 | Park |
| 9,831,043 B2 | 11/2017 | Roumi et al. |
| 9,863,557 B2 | 1/2018 | Haynes et al. |
| 2003/0054215 A1 | 3/2003 | Doshi et al. |
| 2004/0081872 A1 | 4/2004 | Herman et al. |
| 2005/0053531 A1 | 3/2005 | Sakurai et al. |
| 2005/0053819 A1 | 3/2005 | Paz |
| 2005/0081444 A1 | 4/2005 | Anumakonda et al. |
| 2005/0118482 A1 | 6/2005 | Sriramulu et al. |
| 2005/0217991 A1 | 10/2005 | Dahlquist, Jr. |
| 2005/0269234 A1 | 12/2005 | Gore et al. |
| 2006/0051261 A1 | 3/2006 | Rong |
| 2006/0127725 A9 | 6/2006 | Sarkar et al. |
| 2006/0137246 A1 | 6/2006 | Kumar et al. |
| 2007/0099065 A1 | 5/2007 | Rawson et al. |
| 2007/0111069 A1 | 5/2007 | Rehg et al. |
| 2007/0137104 A1 | 6/2007 | Kamijo |
| 2007/0141424 A1 | 6/2007 | Armstrong et al. |
| 2007/0231593 A1 | 10/2007 | Ryu et al. |
| 2007/0237998 A1 | 10/2007 | Armstrong et al. |
| 2008/0118803 A1 | 5/2008 | Dekker et al. |
| 2008/0211226 A1 | 9/2008 | Whitney |
| 2009/0044971 A1 | 2/2009 | Kataoka et al. |
| 2009/0050630 A1 | 2/2009 | Martin et al. |
| 2009/0142639 A1 | 6/2009 | Gregorski |
| 2009/0311570 A1 | 12/2009 | Chou et al. |
| 2010/0001689 A1 | 1/2010 | Hultman et al. |
| 2010/0044971 A1 | 2/2010 | Henry |
| 2015/0004528 A1 | 1/2015 | Palumbo et al. |
| 2015/0357655 A1 | 12/2015 | Choi et al. |
| 2016/0099476 A1 | 4/2016 | Palumbo et al. |
| 2016/0156041 A1 | 6/2016 | Wood et al. |

FOREIGN PATENT DOCUMENTS

| | | |
|---|---|---|
| JP | 2006019119 | 1/2006 |
| JP | 2009140695 | 6/2009 |
| JP | 2011129280 | 6/2011 |
| JP | 2012099348 | 5/2012 |
| JP | 2016091867 | 5/2016 |
| WO | 02/05368 | 1/2002 |
| WO | 2007/076440 | 7/2007 |
| WO | 2011113280 | 9/2011 |
| WO | 2013/088122 | 6/2013 |
| WO | 2013/0216473 | 8/2013 |

OTHER PUBLICATIONS

International Search Report for International PCT Application No. PCT/US2017/046246, dated Dec. 14, 2017, 6 pages.

Baukal Jr., The John Zink Hamworthy Combustion Handbook, Second Edition; vol. 3, Applications, 2013, pp. 321-322, vol. 3. ISBN; 1439839662, CRC Press.

ENrG Incorporated, HEXIM—Improved Thermal Management of SOFC, MCFC, PEM and HTPEM Fuel Cell and Reformer Systems, Apr. 16, 2014. 1 page.

(56) References Cited

OTHER PUBLICATIONS

Flash Back and Flame Arrestors, International Industrial Gases Ltd., 7 pages.
HHO 3/8° Flashback Arrestor Hydrogen Fuel Cell Generator Flash Flame Browns Gas, eBay Jan. 19, 2015, 3 pages.
M.K. Mahapatra et al., "Glass-based seals for solid oxide fuel and electrolyzer cells—A review", Materials Science and Engineering R, 67 (2010), pp. 65-85.
K. Burke et al., "Development of Passive Fuel Cell Thermal Management Materials", May 12, 2009, pp. 1-13.
Leasing, A review of sealing technologies applicable to solid oxide electrolysis cells, Journal of Materials Science, 2007, pp. 3465-3476, vol. 42, No. 10.

PLANAR SOLID OXIDE FUEL UNIT CELL AND STACK

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Protonex Technology Corp., a division of Ballard Corp.

2 BACKGROUND OF THE INVENTION

2.1 Field of the Invention

The exemplary, illustrative, technology herein relates to a unit cell formed from planar elements and to a stack of the unit cells.

The technology herein has application to electrochemical power generation.

2.2 The Related Art

A closely related conventional device is disclosed in U.S. Pat. No. 8,580,452 B2 to Yaguchi et al. published on Nov. 12, 2013. Yaguchi discloses thermally conductive elements that surround a fuel cell stack including a case (20) and gas guide member (50), each made from austenite stainless steel SUS316, and gas guide members (60) and (200). The gas guide members (60) and (200) surround the fuel cell stack between the fuel cell stack and the gas guide member (50). Both members (60) and (200) are said to improve the efficiency of heat transfer to the gas guide member. The material used to form each gas guide member is described as electrically insulating and thermally conductive. However, the form and material composition of the guide member (60), shown in FIG. 2A of Yaguchi, is not disclosed and the material of the layer (200), shown in FIG. 12B of Yaguchi, is described as a ceramic insulating material. One problem with this system disclosed by Yaguchi is that the members (60) and (200) have a relatively low or undisclosed thermal conductivity as compared to such material as copper and are therefore relatively poor thermal conductors. Another problem is that the gas guide member disclosed has a thickness of 0.1 mm which does not provide much thermal mass for thermal conduction. There is a need in the art to improve thermal energy management in SOFC stacks by improved thermal conduction.

Conventional planar SOFC stacks include gas-tight seals to prevent anode and cathode gases from leaking past cells and other stack components, which can result in mixing and combustion of the gases, causing local hot-spots and eventually resulting in stack failure. Conventional gas-tight seals include rigid bonded glass or glass-ceramic composite seals, compliant bonded seals, and compressive gasket seals. Gas tight seals are challenging to form, requiring careful design and assembly of SOFC stacks. One problem with conventional gas-tight seals is that they can include or develop leaks, either due to flaws in manufacturing or caused by damage due to thermal and mechanical stress during operation of the stack. When nominally gas-tight seals become leaky, stack performance can be degraded. Depending on stack design, leaks can render the stack useless or require difficult and expensive stack repair.

Conventional planar SOFC stacks can include compressive seals comprising, for example, metal gasket and mica sheet seals which are compressed between stack components. One problem with conventional compressive seals is that a large amount of compressive force is required to make the compressive seals gas-tight. Another problem with conventional compressive seals is that metal gasket compressive seals can cause short circuiting.

Conventional planar SOFC stacks can include rigid, gas-tight, sealing materials such as glass or combinations of glass and ceramic which are bonded to stack components. Example rigid gas-tight seal composite glass/ceramic materials include $CaO-SiO_2$ and $BaO-Al_2O_3-SiO_2$. One problem with bonded rigid gas-tight seals is that stresses caused by vibrations and mechanical shocks to an SOFC system or SOFC stack are transmitted to the cells by the rigid seals, which can cause the cells to crack or fracture. When rigid gas-tight SOFC seals are used, the entire SOFC stack is often formed as a single unit such that if one cell breaks, the entire stack is no longer usable. Another problem with rigid gas-tight seals is that seal materials must be carefully selected such that a coefficient of thermal expansion of the seal material closely matches a coefficient of thermal expansion of a planar SOFC under stack operating temperature ranges. Matching of coefficients of thermal expansion is required to reduce mechanical stress and cracking due to differential expansion and contraction of the seal and SOFC materials during thermal cycling of the SOFC stack. A further problem with bonded gas-tight SOFC seals is that during thermal cycling of an SOFC stack, rigidly or compliantly bonded cells can be subjected to significant shear stresses and principal stresses, even when SOFC and seal material coefficients of thermal expansion are closely matched. For example, SOFCs bonded with rigid seals can be subjected to shear stress as high as 145 MPa and maximum principal stress of 20-25 MPa despite closely matching coefficients of thermal expansion. Even when bonded with a compliant seal, maximum SOFC stress can be approximately 23 MPa.

U.S. Pat. No. 7,553,579 B2 to Couse and Tang published on Jun. 30, 2009 describes a planar SOFC stack including compliant seals that are described in more detail in U.S. Pat. No. 6,902,798 B2 to Ghosh and Thompson published on Jun. 30, 2009. Couse and Tang describe "floating" planar solid oxide fuel cells which are supported by compliant seals such that the SOFCs do not contact rigid SOFC stack components. The compliant seals described in Ghosh and Thompson are formed by impregnating alumina felt or mat with ceramic or glass particles and pre-compressing the composite structure using a hydraulic press to apply compressive force that is greater than the force that is applied to the seal when it is assembled in a SOFC stack. The ceramic or glass particles are intended to block passage of gas through the composite seal material. One problem with the described seals is that they do not retain the compliance of the untreated and uncompressed alumina felt or mat. Ghosh and Thompson do not disclose a compressive modulus of the formed seal but admit that it is not as compliant as the unimpregnated and uncompressed alumina felt or mat material, stating that the seal "retains some flexibility." Another problem with the described seals is that they are approximately one quarter the thickness of the planar SOFC that they support such that even if the seals retain compliance to absorb mechanical loads, the relatively thin seals retain a limited thickness to accommodate deformation and thereby absorb mechanical loads.

US Pat. App. Publication No. 2009/0142639 A1 to Gregorski, published on Jun. 4, 2009, describes planar SOFCs supported by alumina felt seals that are compressed to a designated thickness to provide a substantially gas tight seal. One problem with Gregorski is that the felt seals are compressed by about 42% of the original seal height to obtain a substantially gas tight seal. The compressed alumina felt seals are not as compliant as seals that are either not compressed or that are compressed to a lesser extent. Another problem with the felt seals is that when the seals are deformed slightly more than is required to obtain a substantially gas tight seals, for example to 47-52% compression, SOFC cracking was noted by the inventors.

3 BRIEF DESCRIPTION OF THE DRAWINGS

The features of the present invention will best be understood from a detailed description of the invention and example embodiments thereof selected for the purposes of illustration and shown in the accompanying drawings in which.

4 DESCRIPTION OF SOME EMBODIMENTS OF THE TECHNOLOGY

4.1 Definitions

Figure 1:
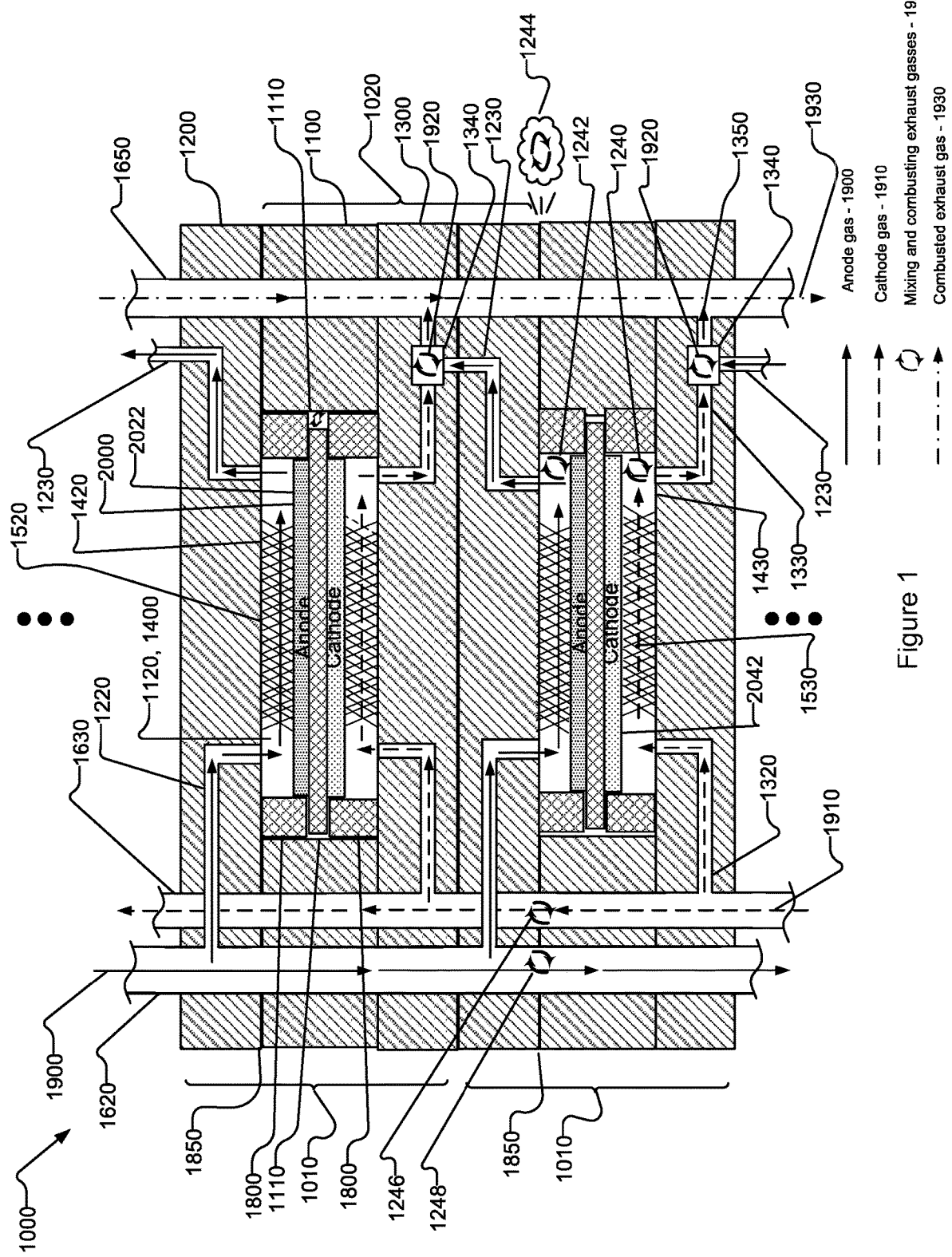
FIG. 1 depicts a schematic side section view taken through a non-limiting exemplary solid oxide fuel cell stack assembly according to the present technology.

The following definitions are used throughout, unless specifically indicated otherwise:

| TERM | DEFINITION |
| --- | --- |
| SOFC | Solid Oxide Fuel Cell |
| Modulus of elasticity | Ratio of stress to strain. Note this can be a tensile stress (along one axis), a shear stress, or a bulk or volumetric stress. |
| Young's modulus | Measures the resistance of a material to elastic (recoverable) deformation under load. A stiff material has a high Young's modulus and changes its shape only slightly under elastic loads (e.g. diamond). A flexible material has a lower Young's modulus and changes its shape considerably (e.g. rubbers). |

4.2 Item Number List

The following item numbers are used throughout, unless specifically indicated otherwise.

| # | DESCRIPTION |
| --- | --- |
| 1000 | HP-SOFC Stack |
| 1010 | Cell unit |
| 1020 | Stack unit |
| 1100 | Spacer plate |
| 1110 | Annular side walls |
| 1120 | Central cavity |
| 1200 | Anode flow plate |
| 1210 | First surface of anode flow plate |
| 1220 | Anode gas inlet |
| 1230 | Anode gas outlet |
| 1240 | Anode gas leak into cathode feed chamber |
| 1242 | Cathode gas leak into anode feed chamber |
| 1244 | Gas leak to stack surroundings |
| 1246 | Anode gas leak into cathode gas manifold |
| 1248 | Cathode gas leak into anode gas manifold |
| 1300 | Cathode flow plate |
| 1310 | First surface of cathode flow plate |
| 1320 | Cathode gas inlet passageway |
| 1330 | Cathode gas outlet passageway |
| 1340 | Exhaust gas combustion chamber |
| 1350 | Exhaust gas passageway |
| 1400 | Cell chamber |
| 1420 | Anode feed chamber |
| 1430 | Cathode feed chamber |
| 1520 | Anode mesh or foam interconnect |
| 1530 | Cathode mesh or foam interconnect |
| 1620 | Anode gas manifold |
| 1630 | Cathode gas manifold |
| 1650 | Exhaust gas manifold |
| 1800 | Compliant seal |
| 1850 | Electrical insulation layer |
| 1900 | Anode gas |
| 1910 | Cathode gas |
| 1920 | Mixed exhaust gas |
| 1930 | Combustion exhaust gas |
| 2000 | Electrolyte supported planar SOFC |
| 2010 | Electrolyte Layer |
| 2020 | Anode electrode layer |
| 2022 | Anode surface |
| 2040 | Cathode electrode layer |
| 2042 | Cathode surface |
| 2050 | Current collector layer |
| 2100 | Anode supported planar SOFC |
| 2110 | Electrolyte Layer |
| 2120 | Anode electrode layer |
| 2122 | Anode surface |
| 2140 | Cathode electrode layer |
| 2142 | Cathode surface |
| 2150 | Current collector layer |
| 2200 | Metal supported planar SOFC |
| 2210 | Electrolyte Layer |
| 2260 | Porous metal plate |
| 2262 | Metal plate surface |
| 2240 | Cathode electrode layer |
| 2242 | Cathode surface |
| 2250 | Current collector layer |

-continued

| # | DESCRIPTION |
|---|---|
| 3000 | HP-SOFC stack |
| 3010 | Cell unit |
| 3520 | Anode formed plate interconnect |
| 3530 | Cathode formed plate interconnect |
| 3532 | Formed plate |
| 3535 | Formed plate flexible tabs |
| 3537 | Formed plate cutout |
| 4000 | HP-SOFC Stack |
| 4010 | Cell unit |
| 4020 | Stack unit |
| 4710 | Separator lining plate |
| 4712 | Exhaust gas through hole |
| 4720 | Anode flow lining plate |
| 4722 | Anode inlet through hole |
| 4724 | Anode outlet through hole |
| 4730 | Cathode flow lining plate |
| 4732 | Cathode inlet through hole |
| 4734 | Cathode outlet through hole |
| 5000 | Quadrilateral HP-SOFC stack gas flow fields |
| 5100 | Cathode manifold gas flow |
| 5110 | Cathode inlet gas flow |
| 5120 | SOFC cathode surface gas flow |
| 5200 | Anode manifold gas flow |
| 5210 | Anode inlet gas flow |
| 5220 | SOFC anode surface gas flow |
| 5230 | Anode exhaust gas flow |
| 5300 | Combustion exhaust manifold gas flow |
| 5310 | Mixed anode and cathode exhaust gas |
| 5320 | Combustion exhaust outlet gas flow |
| 5500 | Quadrilateral planar SOFC |
| 5510 | SOFC cathode surface |
| 5520 | SOFC anode surface |
| 6000 | Circular HP-SOFC stack gas flow fields |
| 6100 | Cathode manifold gas flow |
| 6110 | Cathode inlet gas flow |
| 6120 | SOFC cathode surface gas flow |
| 6200 | Anode manifold gas flow |
| 6210 | Anode inlet gas flow |
| 6220 | SOFC anode surface gas flow |
| 6230 | Anode exhaust gas flow |
| 6232 | Anode exhaust gas flow |
| 6234 | Anode exhaust gas flow |
| 6300 | Combustion exhaust manifold gas flow |
| 6302 | Combustion exhaust manifold gas flow |
| 6304 | Combustion exhaust manifold gas flow |
| 6310 | Mixed anode and cathode exhaust gas |
| 6312 | Mixed anode and cathode exhaust gas |
| 6314 | Mixed anode and cathode exhaust gas |
| 6320 | Combustion exhaust outlet gas flow |
| 6322 | Combustion exhaust outlet gas flow |
| 6324 | Combustion exhaust outlet gas flow |
| 6500 | Circular SOFC |
| 6510 | SOFC cathode face |
| 6520 | SOFC anode face |
| 7000 | HP-SOFC system |
| 7100 | HP-SOFC stack |
| 7102 | First end of HP-SOFC stack |
| 7104 | Second end of HP-SOFC stack |
| 7112 | Positive electrical terminal |
| 7114 | Negative electrical terminal |
| 7122 | Top stack plate |
| 7124 | Bottom stack plate |
| 7150 | SOFC stack exhaust gas |
| 7152 | Combusted SOFC stack exhaust gas |
| 7154 | SOFC system exhaust gas |
| 7160 | Inlet cathode gas |
| 7162 | Warm cathode gas |
| 7170 | Fuel |
| 7172 | Oxidant |
| 7174 | Fuel and oxidant mixture |
| 7176 | Anode fuel |
| 7200 | HP-SOFC stack enclosure |
| 7210 | Thermal insulation |
| 7254 | Exhaust gas conduit |
| 7300 | Cold start module |
| 7400 | Tail gas combustor |
| 7500 | Heat exchanger |

-continued

| # | DESCRIPTION |
|---|---|
| 7600 | Fuel input module |
| 7700 | Fuel reactor |
| 7800 | Electronic controller |
| 7900 | External load |

4.3 Exemplary System Architecture

Figure 3A:
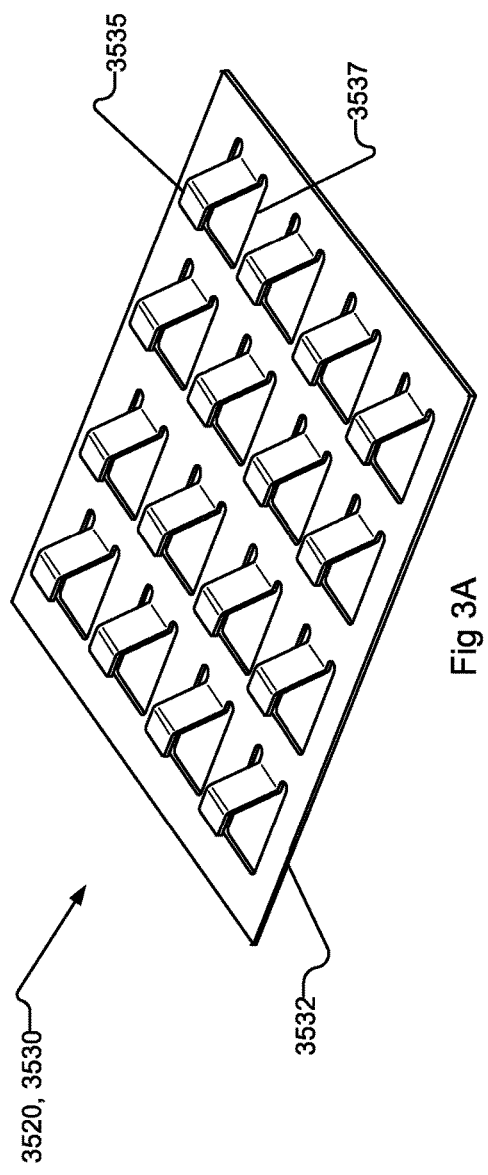
FIG. 3A depicts a schematic view of a non-limiting exemplary formed plate interconnect according to the present technology.
Figure 3B:
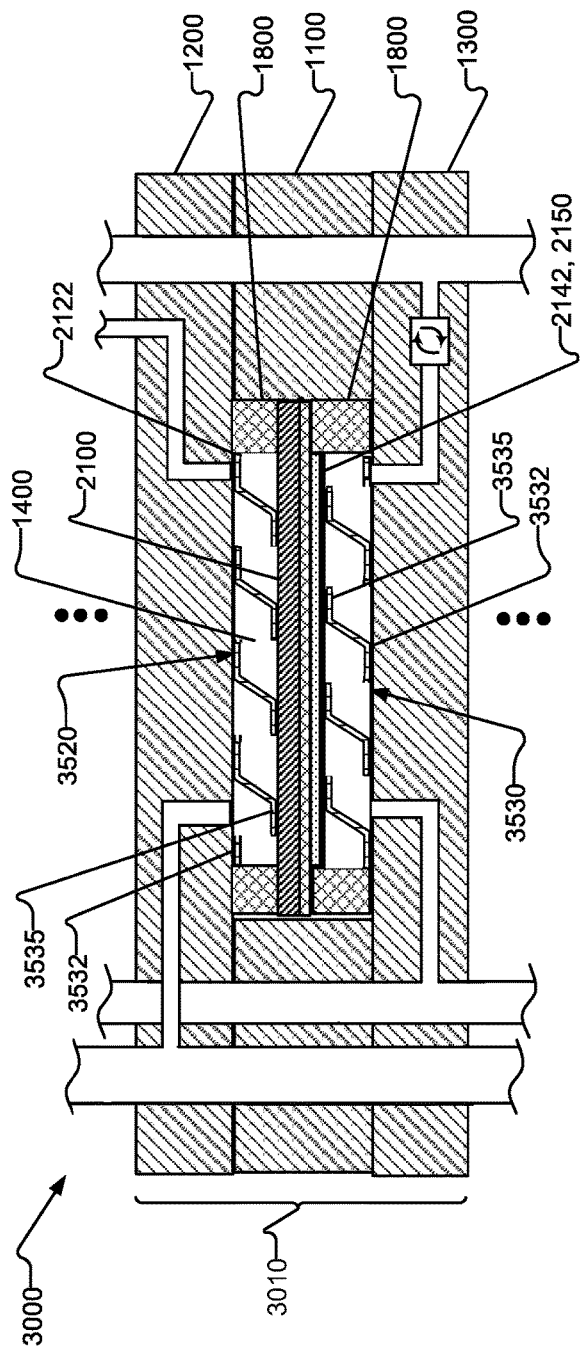
FIG. 3B depicts a schematic side section view taken through a non-limiting exemplary solid oxide fuel cell stack assembly according to the present technology.
Figure 4:
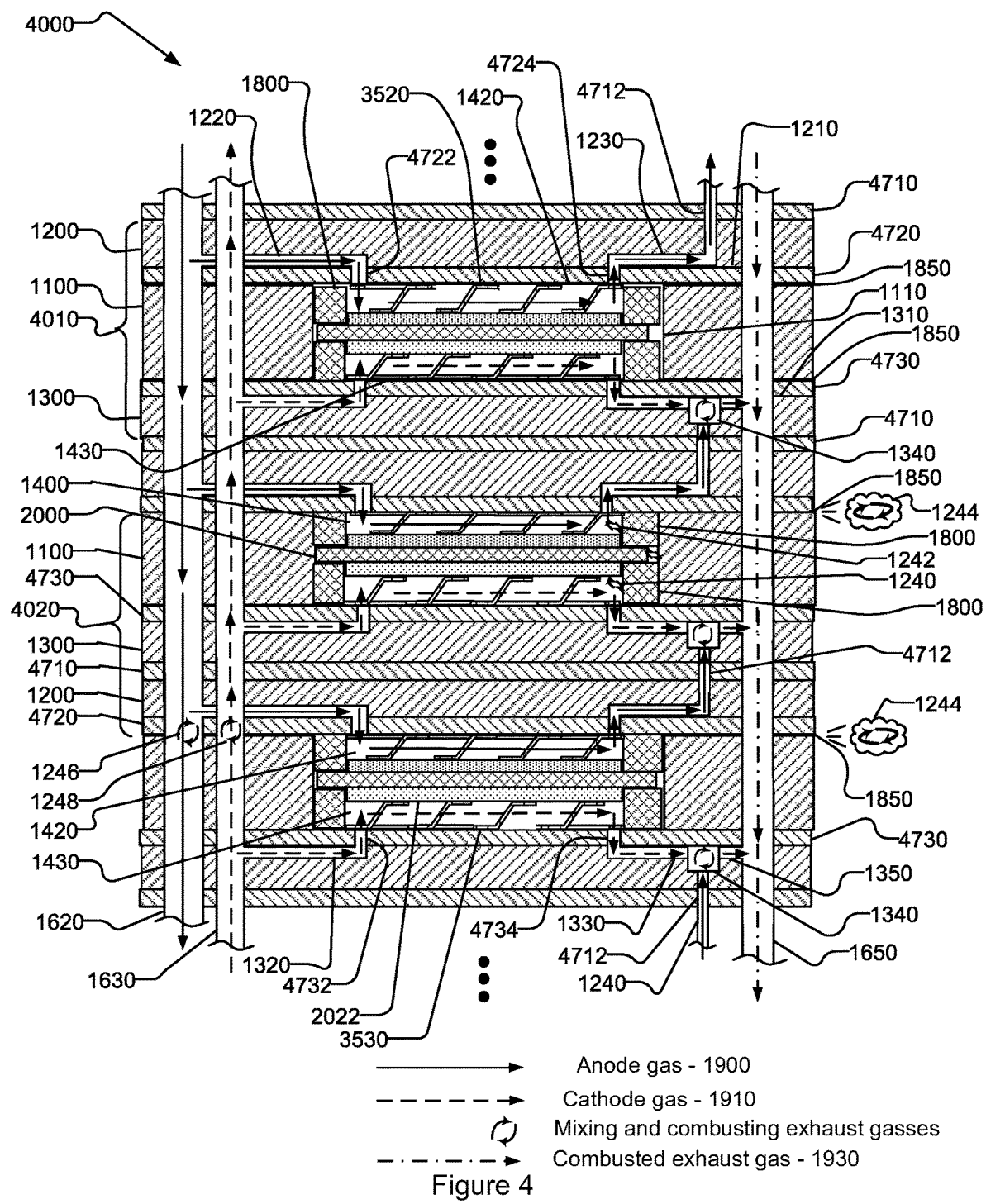
FIG. 4 depicts a schematic side section view taken through a non-limiting exemplary solid oxide fuel cell stack assembly according to the present technology.

Referring to FIGS. 1, 3B, and 4, a high power solid oxide fuel cell (HP-SOFC) stack (1000, 3000, 4000) comprising multiple cell units (1010, 3010, 4010) is shown in schematic side cut-away view. An HP-SOFC stack can include more or fewer cell units that depicted, for example an HP-SOFC stack can include 3, 4, 10, or more cell units. In a preferred embodiment, an HP-SOFC stack includes 18 cell units.

Figure 2A:
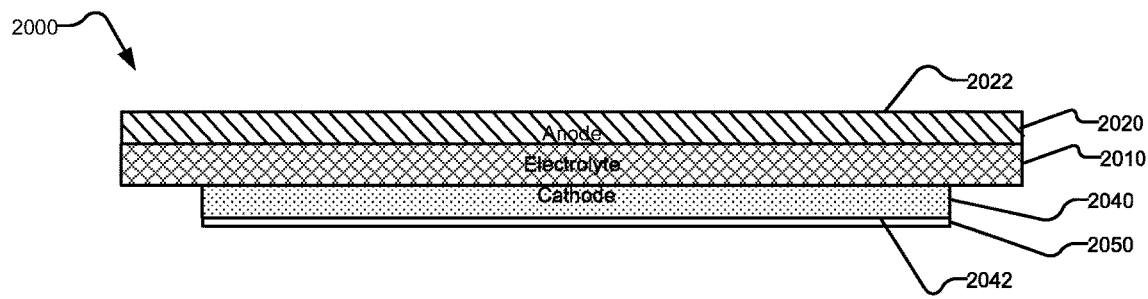
FIG. 2A depicts a schematic side section view taken through a non-limiting exemplary electrolyte supported solid oxide fuel cell according to the present technology.
Figure 2B:
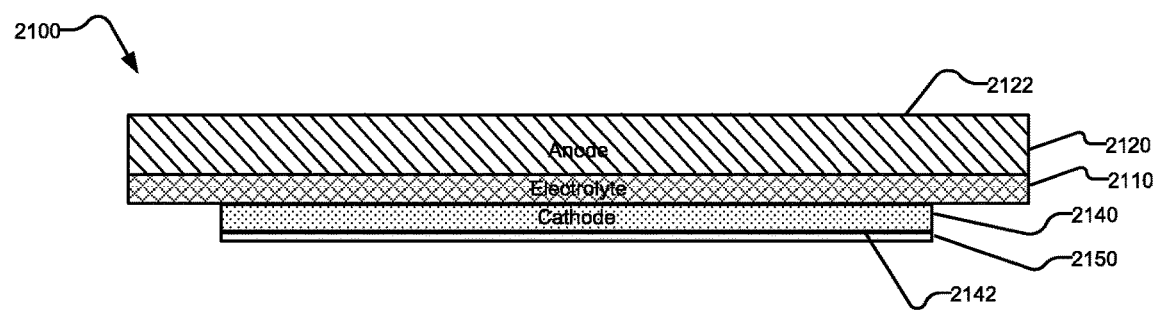
FIG. 2B depicts a schematic side section view taken through a non-limiting exemplary anode supported solid oxide fuel cell according to the present technology.
Figure 2C:
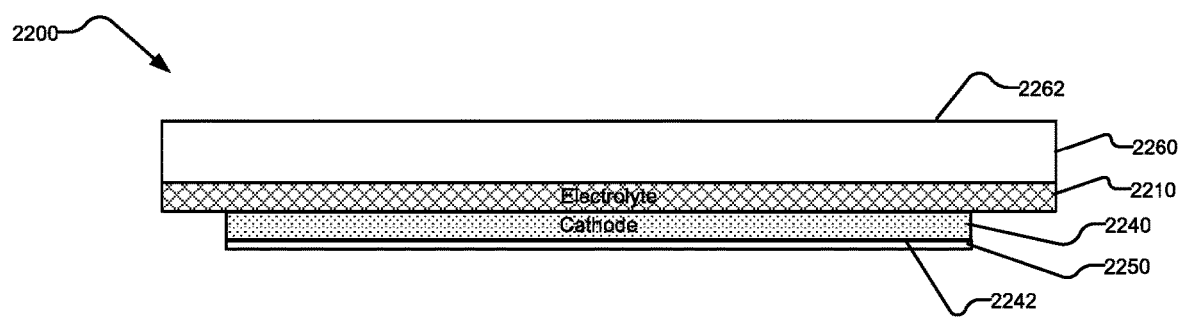
FIG. 2C depicts a schematic side section view taken through a non-limiting exemplary metal supported solid oxide fuel cell according to the present technology.

Each cell unit (1010, 3010, 4010) includes a planar SOFC (2000, 2100, or 2200). Referring to FIGS. 2A, 2B, and 2C, a planar SOFC can include an electrolyte supported SOFC (2000), an anode supported SOFC (2100), or a metal supported SOFC (2200). Cell units (1010 and 1030) are depicted as each including an electrolyte supported SOFC (2000) and cell unit (3010) is depicted including an anode supported SOFC (2100). It is recognized that each cell unit (1010, 3010, 4010) can including any planar SOFC (2000, 2100, 2200) or other suitable planar SOFC (not shown) without departing from concepts of the disclosed technology.

Referring to FIG. 2A planar electrolyte supported SOFC (2000) is shown in side section view. The planar electrolyte supported SOFC (2000) includes an electrolyte layer (2010) comprising any suitable SOFC electrolyte material such as an electrolyte material based on fully or partially stabilized zirconia, doped ceria, doped $LaGaO_3$ and doped $Bi_2O_3$, for example Yttria Stabilized Zirconia (YSZ).

An anode surface (2022) of electrolyte supported planar SOFC (2000) includes an anode electrode (2020) disposed on and supported by the electrolyte (2010). The anode electrode layer can be formed from any suitable SOFC anode electrode material including, for example, Ni or Ni doped ceria.

A cathode surface (2042), opposing the anode surface, includes a cathode electrode (2040) disposed on and supported by the electrolyte. In a non-limiting example, the cathode electrode is formed from one or more conventional SOFC cathode electrode materials including strontium doped lanthanum manganite ($La_{1-x}Sr_xMnO_3$ (LSM)), $Ba_{0.5}Sr_{0.5}Co_{0.6}Fe_{0.4}O_{3-\delta}$ (BSCF), $La_{1-x}Sr_xFe_{1-y}Co_yO_3$ (LSCF), and $Pr_{1-x}Sr_xFeO_3$ (PSF) group cathode materials, and any other suitable SOFC cathode materials.

A current collector layer (2050) is disposed on and partially covers the cathode surface (2042) of the cathode electrode. Current collector layer (2050) can be formed by depositing an electrically conductive material onto cathode surface (2042) using screen printed or any other suitable material layer deposition method. In a non-limiting exemplary embodiment, current collector (2050) is formed from stainless steel.

In further embodiments, cell unit (1010, 3010, 4010) can include SOFC having different configurations such as, for example, anode or metal supported planar SOFCs. Referring to FIGS. 2B and 2C, anode supported SOFC (2100) and metal supported SOFC (2200) are shown in side section view.

Anode supported planar SOFC (2100) includes an anode electrode (2120), including an anode surface (2122). Anode electrode (2120) supports electrolyte layer (2110), cathode layer (2140), and current collector layer (2150) disposed on cathode surface (2142). Anode electrode (2120) can comprise any suitable SOFC anode electrode material, for example NiO—YSZ cermets, perovskite materials based on strontium titanantes, lanthanum chromite, and fluorite materials based on ceria. Anode electrode (2120) can be formed using a method such as tape casting or die pressing. A thin film deposition technique can be used to deposit a thin layer of electrolyte (2110) over anode electrode (2120).

Metal supported planar SOFC (2200) includes a porous metal plate (2260) which supports electrolyte layer (2210), cathode layer (2240), and current collector layer (2250) disposed on cathode surface (2242). In an embodiment, porous metal plate (2260) is formed from material including porous stainless steel. Porous metal plate (2260) can function as an anode electrode such that metal supported SOFC (2200) may not require a separate anode electrode layer and metal plate surface (2262) is equivalent to anode surface (2022, 2122). In an additional non-limiting embodiment (not shown) a layer of anode electrode material is disposed between porous metal plate (2260) and electrolyte later (2210).

A further exemplary planar SOFC (not shown) includes a ceramic supported SOFC substantially similar in configuration to metal supported planar SOFC (2200) wherein a porous ceramic plate is substituted for metal plate (2260) and an anode layer is disposed between the porous ceramic plate and the cathode electrode layer (2240)

Referring to FIGS. 1, 3B, and 4, each cell unit (1010) includes a spacer plate (1100). The spacer plate is formed to include a central cavity (1120) bounded by annular side walls (1110). The central cavity may be formed by a circular though hole that passes through a solid circular spacer plate (1100). The circular bore forms a top and a bottom circular aperture on opposing faces of the spacer plate. In other embodiments, the aperture and plate shapes may be different, e.g. square, rectangular or the other plate and aperture shapes and dimensions are usable without deviating from the present invention. Each cell unit (1010) includes an anode flow plate (1200) and a cathode flow plate (1300). The anode flow (1200) plate is disposed adjacent to the spacer plate (1100) and opposing the anode surface (2020) of the SOFC (2000). The cathode flow plate (1300) is disposed adjacent to the spacer plate (1100) and opposing the cathode surface (2040) of the SOFC. The anode flow plate (1200), cathode flow plate (1300), and spacer plate (1100) together form a cell chamber (1400). Planar SOFC (2000) is disposed within the cell chamber (1400). Note that although FIGS. 1 and 4 include electrolyte supported planar SOFC (2000) and FIG. 3 includes anode supported SOFC (2100), cell units (1010. 3010, 4010) can include any suitable planar SOFC such as, for example, a ceramic supported SOFC, anode supported SOFC (2100), or metal supported SOFC (2200). The annular side walls (1110) of the spacer plate (1100) form walls of the cell chamber. The anode and cathode flow plates (1200, 1300) form top and bottom walls of the cell chamber.

In each unit cell (1010), at least the cathode flow plate is in mating contact with the spacer plate such that each of the cathode flow plate are thermally conductively coupled across the planar boundary between the two matting plates. In the case of the planar boundary formed between the spacer plate and the anode flow plate this boundary is electrically insulated by a substantially planar electrical insulator (1850) shown in FIG. 1 and described below. Since the electrical insulator is also thermally insulating, the spacer plate and the anode flow plate are not thermally conductively coupled across the planar boundary between the two matting plates. However, is further shown in FIG. 1 each stack unit (1020) includes a spacer plate (1100), a cathode flow plate (1300) and an anode flow plate (1200) all thermally conductively coupled across the planar boundary formed between the three matting plates. Thus each stack unit (1020) provides a substantially solid volume of plate material formed as a substantially continuous thermally conducive pathway that extends from the central cavity to the perimeter edges of the stack unit (1020) and as will be further described below the substantially solid volume of plate material when formed from one or more materials having a coefficient of thermal conductivity between 100 and 400 W/(m·K) and formed with sufficient thermal mass rapidly distributed thermal energy uniformly throughout the substantially solid volume of plate material and allows the solid volume to remain at a substantially constant temperature during steady state operation of the planar SOFC. The spacer plate (1100), anode flow plate (1200), and cathode flow plate (1300) are each formed from one or more materials having a high coefficient of thermal conductivity, e.g. between 100 and 300 W/(m·K), and preferably above 200 W/(m·K). Accordingly, the spacer plate (1100), anode flow plate (1200), and cathode flow plate (1300) are each fabricated from one or more of copper, molybdenum, aluminum, copper nickel alloys, or a combination thereof. In an embodiment spacer plate (1100), anode flow plate (1200), and cathode flow plate (1300) are each fabricated from a material comprising copper which has a coefficient of thermal conductivity preferably in the range of 330 (m·K) to 400 W/(m·K) or greater and a melting temperature of approximately 1085° C. or less, depending on temperature of the material and composition of alloys.

In a further embodiment including low temperature SOFCs, e.g. SOFCs operating at a temperature of approximately 500° C. or less, the spacer plate (1100), anode flow plate (1200), and cathode flow plate (1300) are each fabricated from an aluminum alloy capable of operating at temperatures of approximately 500° C. or less, i.e. alloys with a melting point greater than 500° C. In an embodiment, the aluminum alloy is Al 6061 having a melting point of approximately 582-652° C. and a coefficient of thermal conductivity of 167 W/m-K. Further, the spacer plate (1100), anode flow plate (1200), and cathode flow plate (1300) include sufficient thermal mass to rapidly conduct thermal energy throughout and between each of the plates. As used herein, the term thermal conductor plate shall refer to a spacer plate (1100), anode flow plate (1200), and cathode flow plate (1300), or any other plate comprising a HP-SOFC stack (1000, 3000, 4000) formed from one or more materials having a coefficient of thermal conductivity equal to or greater than 100 W/(m·K) and having sufficient thermal mass to rapidly conduct thermal energy.

A particular advantage of the present invention is that by surrounding the cell chamber with high thermal conductivity plates formed with sufficient thermal mass, thermal energy generated by the planar SOFC operating inside the cell chamber is rapidly absorbed and uniformly distributed throughout the stack unit and further distributed to other stack units that are in thermally conductive contact with the stack unit in large stacks of stack units.

Each HP-SOFC stack (1000, 3000, 4000) is made up of multiple cell units (1010, 3010, 4010), each cell unit comprising thermal conductor plates. Specifically, each of the thermal conductor plates of HP-SOFC stack (1000, 3000,

4000) is configured to provide a substantially continuous thermally conductive pathway that extends from each cell chamber to the entire thermal mass of the local stack unit for rapid transfer of thermal energy from one location in the stack to other locations throughout the stack to more rapidly reduce temperature gradients and maintain the entire HP-SOFC stack substantially at the same temperature. The HP-SOFC stack (1000, 4000) is maintained at a high operating temperature (e.g. ranging from 350 to 1200° C.), depending on the composition of the solid material layers of the fuel cell stack and the characteristics of the anode and cathode gases. In addition, thermal energy is continuously emitted from outer surfaces of the entire HP-SPFC stack to surrounding air. A preferred operating temperature is selected to support efficient electro-chemical energy generation.

The cell chamber (1400) includes an anode feed chamber (1420) opposing the anode surface (2022) of the SOFC (2000) and a cathode feed chamber (1430) opposing the cathode surface (2042) of the SOFC. The anode feed chamber (1420) is bounded by the annular side walls (1110) of the spacer plate, the anode surface of the SOFC (2020), and by the anode flow plate (1200). The cathode feed chamber (1430) is bounded by the annular side walls (1110) of the spacer plate, by the cathode surface of the SOFC (2040), and by the cathode flow plate (1300).

An anode mesh or foam interconnect (1520) is disposed within the anode feed chamber (1420), positioned between and in electrical contact with the anode electrode (2020) of the cell and the anode flow plate (1200). A cathode mesh or foam interconnect (1530) is disposed within the cathode feed chamber (1430), positioned between and in electrical contact with the cathode electrode (2040) and/or current collector (2050) of the cell and the cathode flow plate (1300). The anode and cathode mesh or foam interconnects (1520, 1530) are each made from an electrically and thermally conductive material, for example, a material comprising copper and/or nickel. Anode mesh or foam interconnect (1520) provides and electrically conductive pathway between anode electrode (2020) and anode flow plate (1200) and cathode mesh or foam interconnect (1530) provides and electrically conductive pathway between cathode electrode (2040) and/or current collector (2050) and cathode flow plate (1300). In a non-limiting exemplary embodiment, the anode and cathode mesh or foam interconnects are made from copper which has an electrical resistivity of about $1.68 \times 10^{-8}$ Ohm-m and a coefficient of thermal conductivity of about 330 (m·K) to 400 W/(m·K) or greater, depending on temperature of the material and composition of alloys.

The anode and cathode mesh or foam interconnects (1520, 1530) are formed with passageways or channels through which anode and cathode gas can flow. Further, the anode and cathode mesh or foam interconnects are each configured to be compliant such that they flex or deform when compressed. When the HP-SOFC stack is assembled, the mesh or foam interconnects (1520, 1530) are mechanically loaded in compression. Each mesh or foam interconnect (1520, 1530) is configured to deform when compressive forces are increased and expand when compressive forces are decreased such that electrical contact is maintained between the mesh or foam interconnects (1520, 1530), anode and cathode surfaces of SOFC (2000), and flow plates (1200, 1300) opposing each anode and cathode surface.

In an embodiment, the anode and cathode mesh or foam interconnects (1520, 1530) comprise a non-rigid open-cell foam or mesh of copper or other appropriate metal having interconnected void space through which gases can flow. Each foam or mesh interconnect (1520, 1530) is configured to deform when compressed without completely collapsing void spaces therein when the HP-SOFC stack is assembled and during operation of the HP-SOFC stack.

Referring to FIGS. 3A, 3B, and 4, a further exemplary, non-limiting, embodiment of an HP-SOFC stack (3000) includes formed plate interconnects (3520, 3530). Formed plate interconnects (3520, 3530) are fabricated from a formed plate (3532) of material, for example, a metal plate having thickness between 0.002 and 0.090 inches. In a non-limiting exemplary embodiment, formed plate (3532) is fabricated from a metal plate having thickness of approximately 0.01 inches. Formed plate interconnects (3520, 3530) are formed from an electrically conductive material or a base material with an electrically conductive plating or coating. For example, formed plate interconnects (3520, 3530) can be formed from materials including alloys containing nickel or alloys containing iron where the alloys are coated with one or more electrically conductive materials including, for example silver, platinum, palladium, gold, or a conductive ceramic coating such as a spinel coating. In an embodiment, formed plate interconnects (3520, 3530) comprise copper which has an electrical resistivity of about $1.68 \times 10^{-8}$ Ohm-m and a coefficient of thermal conductivity of about 330 (m·K) to 400 W/(m·K) or greater, depending on temperature of the material and composition of alloys.

Formed plate interconnects (3520, 3530) each include flexible tabs (3535) which are formed from partial cutouts (3537) of plate (3532). Metal plate (3532) of each formed plate interconnect (3520, 3530) is disposed adjacent to and in contact with an anode flow plate (1200) or cathode flow plate (1300). Flexible tabs (3535) of formed plate interconnect (3520) extend from the metal plate (3532), which is in contact with anode flow plate (1200), to contact anode surface (2122). Flexible tabs (3535) of formed plate interconnect (3530) extend from the metal plate (3532), which is in contact with cathode flow plate (1300), to contact cathode surface (2142) and/or current collector (2150). Flexible tabs (3535) are configured and disposed to be subjected to compression forces which cause partial bending of the flexible tabs when the HP-SOFC stack is assembled.

Flexible tabs (3535) are configured to bend and flex under changing compressive load during stack assembly and stack operation such that flexible tabs (3535) remain in physical and electrical contact with SOFC (2100) and opposing plates (1200, 1300). The tabs are configured and disposed with open spaces therebetween to enable flow of anode and cathode gases therethrough. Referring to FIG. 3A, anode formed plate interconnect (3520) provides an electrically conductive pathway between anode electrode (2120) and anode flow plate (1200) and cathode formed plate interconnect (3530) provides and electrically conductive pathway between cathode electrode (2140) and/or current collector (2050) and cathode flow plate (1300). Referring to FIG. 4, anode formed plate interconnect (3520) provides an electrically conductive pathway between anode electrode (2120) and anode flow lining plate (4720) and cathode formed plate interconnect (3530) provides and electrically conductive pathway between cathode electrode (2140) and/or current collector (2050) and cathode flow lining plate (4730).

Referring to FIGS. 1, 3B, and 4, thermal energy is exchanged between the SOFC (2000, 2100), or alternatively SOFC (2200) or other suitable planar SOFC, and the surrounding thermal conductor plates (1100, 1200, 1300) that form the cell chamber (1400). In an embodiment, each SOFC (2200) has a mass of approximately 24 grams and is surrounded by thermal conductor plates having a collective mass of approximately 340 grams and comprising material having a having a high coefficient of thermal conductivity, e.g. between 100 and 300 W/(m·K), and preferably above 200 W/(m·K). Thermal energy is transferred between the SOFC (2000, 2100) and the thermal conductor plates (1100, 1200, 1300), for example, via radiation heat transfer, via conductive heat transfer through the anode and cathode mesh or foam interconnects (1520, 1530) or formed plate interconnects (3520, 3530), or via a combination of radiation and conduction. Thermal energy can also be transferred to the SOFC (2000, 2100) by convection via anode and cathode gases, which may be warmed by the thermal conductor plates.

The thermal conductor plates (1100, 1200, 1300) provide a thermally conductive pathway through which thermal energy is directed to the SOFC (2000) during a system startup to bring the temperature of the SOFC to operating temperature. During system operation, the HP-SOFC stack is maintained at a substantially constant and uniform temperature and thermal energy is exchanged between the SOFC (2000, 2100) and the surrounding thermal conductor plates (1100, 1200, 1300) to maintain the SOFC at a desired operating temperature. Each SOFC (2000, 2100) is surrounded by stack components that are maintained at an essentially uniform and constant temperature by rapid conduction of thermal energy. Therefore, temperature gradients across each SOFC, which could impact cell efficiency and cause mechanical stress due to differential thermal expansion and contraction of the cell, are substantially reduced or eliminated.

The anode flow plate (1200), cathode flow plate (1300), and spacer plate (1100) each include holes therethrough which are aligned when the plates are assembled in the HP-SOFC stack to form a cathode gas manifold (1630), an anode gas manifold (1620), and an exhaust gas manifold (1650). In an embodiment, an HP-SOFC stack includes one or more manifolds of each type. In an exemplary embodiment, an HP-SOFC stack includes three anode gas manifolds, three cathode gas manifolds, and six exhaust gas manifolds.

Anode and cathode gas manifolds (1620, 1630) are formed within thermal conductor plates (1100, 1200, 1300) of the HP-SOFC stack and thereby comprise materials having a high coefficient of thermal conductivity. The anode and cathode gas manifolds (1620, 1630) are maintained at the substantially uniform stack operating temperature. Anode gas (1900), e.g., a fuel/air mixture processed by a catalytic partial oxidation (CPOX) reactor, steam reformer, auto-thermal reformer or a combination thereof, passing through anode gas manifold (1620) and cathode gas (1910), e.g., oxygen, air or other gas mixture comprising oxygen, passing through cathode gas manifold (1630) exchange thermal energy with the HP-SOFC stack, e.g., cathode gas is continuously warmed as it passes through the HP-SOFC stack until it reaches stack temperature and is at substantially the same temperature as stack components including SOFCs. The thermal conductor plates (1100, 1200, 1300), SOFCs (2000, 2100), and anode and cathode gases (1900, 1910) are maintained at a substantially uniform temperature thereby reducing temperature gradients and thermal stress during stack operation.

The cathode flow plate (1300) includes at least one cathode gas inlet passageway (1320) or channel disposed to connect a cathode gas manifold (1630) with the cathode feed chamber (1443). The cathode flow plate (1300) further includes at least one exhaust gas combustion chamber (1340) formed within the plate or upon a surface of the plate, a cathode outlet passageway (1330) or channel disposed to connect the cathode feed chamber (1430) to an exhaust gas combustion chamber (1340), and an exhaust gas passageway (1350) disposed to connect the exhaust gas combustion chamber with an exhaust gas manifold.

The anode flow plate (1200) includes at least one anode gas inlet channel (1220) or passageway disposed to connect an anode gas manifold (1620) with the anode feed chamber (1420). The anode flow plate (1200) further includes at least one anode outlet channel (1230) or passageway disposed to connect the anode feed chamber (1420) to an exhaust gas combustion chamber (1340) of an adjacent cathode flow plate (1300). In an alternative embodiment, an exhaust gas combustion chamber is formed in the anode flow palate and in a stiff further embodiment, an exhaust gas combustion chamber is formed partly is each of the anode and cathode flow plates.

Each cell unit (1010, 4010) includes a layer of temperature resistant electrically insulating material disposed between the spacer plate (1100) and the anode flow plate (1200) to form an electric insulation layer (1850). The electric insulation layer prevents the anode electrode (2120) and cathode electrode (2140) of a SOFC (2000) from electrically shorting.

4.3.1 Oxidation Protection

Portions of the thermal conductor plates (1100, 1200, 1300) and formed plate interconnects (3520, 3530) are exposed to corrosive anode, cathode, and exhaust gases. In an embodiment, the thermal conductor plates (1100, 1200, 1300) and formed plate interconnects (3520, 3530) are each coated with a corrosive resistant metal, such as nickel, to protect the plates from oxidation. In further embodiments, the passageway walls formed in the plates are coated with brazing material to provide a protective coating. In still further embodiments, passageway walls are lined with high temperature corrosive-resistant metal inserts, for example inserts fabricated from Monel or Inconel. In still further embodiments, a combination of protective coatings and/or linings or coverings is used to protect the surfaces of the plates.

Referring to FIG. 4, in a particular embodiment, corrosion protection for the thermal conductor plates (1100, 1200, 1300) is provided by covering surfaces of the thermal conductor plates with lining plates (4710, 4720, 4730) formed from a high temperature, oxidation resistant material, for example a super alloy such as Hastelloy or Monel. In an embodiment, lining plates are formed from Monel. Lining plates include separator lining plates (4710), anode flow lining plates (4720), and cathode flow lining plates (4730). The lining plates (4710, 4720, 4730) are positioned in the stack adjacent to thermal conductor plates (1100, 1200, 1300).

The anode flow lining plate (4720) and separator lining plate (4710) are stacked adjacent to the anode flow plate (1200) with the anode flow lining plate (4720) opposing the anode feed chamber (1420) and the lining separator plate (4710) stacked between the anode flow plate (1200) and an adjacent cathode flow plate (1300).

The cathode flow lining plate (4730) and separator lining plates (4710) are stacked adjacent to the cathode flow plate (1300) with the cathode flow lining plate (4730) opposing the cathode feed chamber (1430) and the separator lining plate (4710) stacked between the cathode flow plate (1300) and an adjacent anode flow plate (1200).

Each of the anode flow lining plate (4720), cathode flow lining plate (4730), and separator lining plate (4710) include manifold through holes that, together with manifold through holes of the anode flow plate, cathode flow plate, and spacer plate, form the anode, cathode, and exhaust gas manifolds (1620, 1630, 1650).

Referring to FIG. 4, in an embodiment, the side walls of anode and cathode inlet passageways (1220, 1320), of anode and cathode outlet passageways (1230, 1330), of exhaust gas combustion chamber (1340), and of exhaust gas passageway (1350) are formed by channels formed on a first surface (1210) of the anode flow plate (1200) and on a first surface (1310) of the cathode flow plate (1300). The anode flow lining plate (4720) and cathode flow lining plate (4730) provide top or bottom walls that enclose the grooves or channels to form the passageways and combustion chamber. The anode flow lining plate (4720) includes an inlet through hole (4722) disposed to connect an anode gas inlet (1220) to the anode feed chamber (1420) and an outlet through hole (4724) disposed to connect the anode feed chamber to the anode gas outlet (1230). The cathode flow lining plate (4730) includes a cathode inlet through hole (4732) disposed to connect the cathode gas inlet passageway (1320) to the cathode feed chamber (1430) and an outlet through hole (4734) disposed to connect the cathode feed chamber to the cathode gas outlet passageway (1330). The lining separator plate (4710) includes an exhaust gas through hole (4712) to connect an anode outlet channel (1240) to an exhaust gas combustion chamber (1340) of an adjacent cathode flow plate (1300).

In a further embodiment (not shown) passageways, anode and cathode feed chambers, and combustion chambers include side walls formed by channels which extend through a full thickness of the thermal conductor anode and cathode flow plates and the thermal conductor spacer plates. The lining anode flow plate and lining separator plates form top and bottom walls of the anode inlet passageway and anode outlet passageways. The lining anode flow plate includes an inlet through hole that connects the anode inlet passageway to the anode feed chamber. The lining anode flow plate includes one or more outlet through holes, each outlet through hole connecting the anode feed chamber to an anode outlet passageway. The lining cathode flow plate and lining separator plates form top and bottom walls of the cathode inlet passageway, cathode outlet passageways, and exhaust gas combustion chambers. The lining cathode flow plate includes an inlet through hole that connects the cathode inlet passageway to the cathode feed chamber. The lining cathode flow plate includes one or more outlet through holes, each outlet through hole connecting the cathode feed chamber to a cathode outlet passageway.

4.3.2 Compliant Seals

Referring to FIGS. 1 and 4, two high temperature compliant annular seals (1800) support SOFC (2000) within the cell chamber (1400). In an embodiment, annular high temperature compliant seals (1800) are formed from high temperature felt, e.g. a non-woven fabric formed from matted ceramic wool, a silica-based material such as Flexatallic available from Flexatallic, L.P. of Deer Park, Tex., or a combination thereof. In an embodiment comprising low temperature SOFCs and a comparatively lower operating temperature, compliant seals (1800) can be formed from materials including graphite or carbon fiber.

A first high temperature compliant seal (1800) is disposed between the SOFC (2000) and the anode flow plate (1200) or anode flow lining plate (4720) and a second high temperature compliant seal is disposed between the SOFC (2000) and the cathode flow plate (1300) or cathode flow lining plate (4730). The high temperature compliant seals (1800) are configured and disposed along a peripheral edge of the corresponding anode and cathode gas feed chambers such that a substantial portion of each of the anode and cathode surfaces of the SOFC is exposed, i.e. not covered by the compliant seal. The compliant seals (1800) provide a gas seal between the anode and cathode feed chambers by sealing any gaps that may exist between the SOFC and the annular walls (1110) of the spacer plate. The compliant seals (1800) further provide a gas seal between the cell chamber (1400) and an environment outside of the stack by sealing any gaps that may exist between the spacer plate (1100) and each of the anode and cathode flow plates (1200, 1300) or lining plates (4720, 4730). However, since each compliant seal comprises a felt, matted fabric, and/or fibers the gas seal may be imperfect allowing some anode and cathode gas to pass through the corresponding seal and mix at the peripheral edge of the central cell chamber (1400), such as between the first and second compliant seals.

In an embodiment, the compliant seals (1800) may or may not provide completely gas-tight seals since the seal material is at least slightly porous; however, some leaking is expected. In practice, anode and cathode gas each leak past the compliant seals (1800) e.g. to accumulate at the peripheral edge of the central cavity and may further leak beyond the peripheral edge along the electrical insulators (1850) to exit the HP-SOFC stack at region (1244). The mixed gases (1242) within anode feed chamber (1420) and mixed gases (1240) within the cathode feed chamber (1430) tend to auto-ignite. The ignited mixed gas releases thermal energy near the location of the leak. The thermal energy is absorbed by the thermal conductor components of the HP-SOFC stack and is rapidly conducted throughout the stack, thereby preventing a focal increase in temperature (i.e. a hotspot) that could damage stack components.

4.3.3 Thermal Energy Transfer

Referring to FIG. 1, each SOFC (2000) is disposed in a cell chamber (1400) which is defined by and enclosed by thermal plates including spacer plate (1100), anode flow plate (1200), and cathode flow plate (1300). In an embodiment, each of spacer plate (1100), anode flow plate (1200), and cathode flow plate are formed from material substantially comprising copper. Referring to FIG. 3, cell chamber (1400) can also include two formed plate interconnects (3520, 3530), which, in an embodiment, are each formed from material substantially comprising copper. In a particular embodiment of HP-SOFC stack (1000), a thermal mass of thermal plates and interconnects comprising the HP-SOFC stack is much greater than the thermal mass of SOFCs and other stack components.

The thermal mass $C_{th}$ of each HP-SOFC stack component is defined as the product of component material mass (m) in units of (g) and the specific heat capacity (µ) in units of (J/g° C.) of the component material, where mass (m) is the product of component material volume V in units of (cm³) and material density (ρ) in units of (g/cm³).

$$C_{th} = \rho V \mu \qquad \text{EQU. 1}$$

where ρ=material density (g/cm³)

V=material volume (cm³)

µ=material specific heat capacity of the material (J/g° C.).

In a non-limiting example embodiment spacer plate (1100), anode flow plate (1200), and cathode flow plate (1300) enclosing cell chamber (1400) and formed plate interconnects (1520, 1530) disposed within cell chamber (1400) each comprises mostly copper and the SOFC (2100) comprises mostly yttria stabilized zirconia (YSZ) or a composite of YSZ and other materials, including cathode and anode electrode materials, as is well known to one familiar with the art. For copper, the specific heat capacity (μ) is 0.385 J/g° C. For YSZ and YSZ composites, the specific heat capacity (μ) of SOFC (2000) can be estimated to be approximately 0.6 J/g° C. For copper, the density (ρ) is 8.96 g/cm³ and for SOFC (2000), the density (ρ) is approximated as 6.01 g/cm³.

Referring to Table 1, calculations of thermal mass of thermal mass of stack components of an exemplary, non-limiting, embodiment of HP-SOFC stack (1000, 3000) are shown.

TABLE 1

HP-SOFC stack component properties

| Component | Volume (cm³) | Density (g/cm³) | Specific heat capacity (J/g° C.) | Thermal mass (J/° C.) | Mass (g) |
|---|---|---|---|---|---|
| SOFC (2000) | 4.0 | 6.01 | 0.6 | 14.5 | 24.2 |
| Spacer plate (1100) | 14.6 | 8.96 | .385 | 50.3 | 130.7 |
| Anode flow plate (1200) | 10.2 | 8.96 | .385 | 35.0 | 91.0 |
| Cathode flow plate (1300) | 9.9 | 8.96 | .385 | 34.2 | 88.7 |
| Formed plate interconnect (3520) | 1.4 | 8.96 | .385 | 4.9 | 12.8 |
| Formed plate interconnect (1530) | 1.4 | 8.96 | .385 | 4.9 | 12.8 |
| Total for thermal plates and interconnects (sum) | 37.5 | | | 129.4 | 336.1 |

Referring to Table 1, a total mass of components of a single cell unit (1010, 3010) that are formed from materials predominantly comprising copper, including thermal plates (1100, 1200, 1300) and formed plate interconnects (3520, 3530), is approximately 336.1 grams, with a total thermal mass of approximately 129.4 J/° C. In contrast, the mass of SOFC (2000) is approximately 24.2 g, with a thermal mass of approximately 14.5 J/° C. The thermal mass of HP-SOFC stack (1000, 3000) components comprising copper (i.e. 1100, 1200, 1300, 1520, 1530, 3520, 3530) is thus approximately 9 times the thermal mass of SOFC (2000). Thermal characteristics of the HP-SOFC stack (2000) are thus governed predominantly by the thermal plates and formed plate interconnects which have properties including high coefficient of thermal conductivity, e.g. between 100 and 300 W/(m·K), and preferably above 200 W/(m·K) and, for example the case of copper a coefficient of thermal conductivity of about 400 W/(m·K) or greater, for example 401 W/(m·K). The relatively large thermal mass of materials having a high coefficient of thermal conductivity provide a substantial reservoir for absorption of thermal energy generated within the HP-SOFC stack and provide a thermal pathway for rapid conduction of absorbed thermal energy throughout the stack. Thermal energy generated by combustion of mixed anode and cathode gases is thus preferentially absorbed and rapidly conducted by HP-SOFC stack components including thermal plates (1100, 1200, 1300) and formed plate interconnects (3520, 3530) which protects SOFC (2000) from thermal stresses and high temperatures that could otherwise be transferred to the SOFC when mixed gases ignite.

Referring to table 1, in the exemplary embodiment a thermal mass of copper components approximately 129.4 J/° C. and a thermal mass of SOFC (2000) is approximately 14.5 J/° C., thus a thermal mass of copper components approximately 9 times the thermal mass of SOFC (2000) such that thermal plates (1100, 1200, 1300) and formed plate interconnects (3520, 3530) absorb more thermal energy than SOFC (2000).

Referring to FIG. 4, in a further non-limiting example, HP-SOFC stack includes lining plates disposed to protect thermal plates (1100, 1200, 1300) from oxidation. A cell unit (4010) include separator lining plate (4710), anode flow lining plate (4720), and cathode flow lining plate (4730). In an embodiment, each lining plate (4710, 4720, 4730) is formed from a material predominantly comprising Monel, with a density of approximately 8.8 g/cm³ and specific heat capacity approximately 0.427 J/g° C. Referring to Table 2, a total mass of lining plates (4710, 4720, 4730) formed from Monel is approximately 135.5 g and a thermal mass of the lining plates is approximately 57.9 J/g° C. Referring to Tables 1 and 2, the thermal mass of HP-SOFC stack (3000, 4000) components comprising copper (i.e. 1100, 1200, 1300, 1520, 1530) is thus approximately 2.2 times the thermal mass of lining plates (4710, 4720, 4730). The total thermal mass of components comprising copper and lining plates comprising Monel is approximately 13 times the thermal mass of SOFC (2000).

TABLE 2

Properties of lining plates

| Component | Volume (cm³) | Density (g/cm³) | Specific heat capacity (J/g° C.) | Thermal mass (J/g° C.) | Mass (g) |
|---|---|---|---|---|---|
| Separator lining plate (4710) | 5.2 | 8.8 | .427 | 19.2 | 45.8 |
| Anode flow lining plate (4720) | 5.1 | 8.8 | .427 | 19.2 | 44.9 |
| Cathode flow lining plate (4730) | 5.1 | 8.8 | .427 | 19.5 | 44.9 |
| Total for lining plates (sum) | 15.4 | | | 57.9 | 135.5 |

Thermal energy transfer rate (Q/t) is governed by equation:

$$Q/t = kA(T_2 - T_1)/d \qquad \text{EQU. 2}$$

Where Q/t=heat transfer rate;

k=thermal conductivity

A=surface area of a stack plate d=thickness of a stack plate $T_2-T_1$=temperature difference across a thickness of a stack plate.

For a particular temperature difference ($T_2-T_1$) across a thickness of a stack plate, for example across spacer plate (1100), anode flow plate (1200), or cathode flow plate (1300), a rate of thermal energy conduction (Q/t) is a function of the plate cross-sectional surface area (A), thickness (d), and coefficient of thermal conductivity (k). Referring to equation 2, Q/t is a function of (A·k)/d. Referring to Table 3, for an exemplary, non-limiting embodiment of an HP-SOFC stack, for spacer plate (1100) Q/t equals approximately 553($T_2-T_1$) and thereby is the thermal plate stack component with the greatest resistance to heat flux according to estimates made using equation 2.

TABLE 3

Heat flux properties of thermal plates and lining plates

| Component | A = Cross sectional area (cm$^2$) | d = Thickness (cm) | A/d (m) | k (W/(m·K)) | Ak/d (W/K) |
|---|---|---|---|---|---|
| Spacer plate (1100) | 44.9 | .325 | 1.38 | 401 | 553 |
| Anode flow plate (1200) | 118 | .086 | 13.7 | 401 | 5493 |
| Cathode flow plate (1300) | 115 | .086 | 13.4 | 401 | 5373 |
| Separator lining plate (4710) | 127 | .041 | 30.9 | 26 | 803 |
| Anode flow lining plate (4720) | 126 | .041 | 30.7 | 26 | 798 |
| Cathode flow lining plate (4730) | 126 | .041 | 30.7 | 26 | 798 |

Referring to Table 1, spacer plate (1100) comprising copper has a thermal mass of approximately 50.3 J/° C. A conventional SOFC stack comprising a spacer plate similar to spacer plate (1100) can include a plate formed from a conventional stack material such as stainless steel or a high performance super alloy such as Hastelloy. A spacer plate (1100) formed from stainless steel and having a thermal mass similar to a copper spacer plate (1100) (i.e. a stainless steel spacer plate capable of absorbing a similar amount of thermal energy as compared to a copper spacer plate) has a cross sectional area of 44.9 cm² and a thickness of approximately 0.298 cm. A thermal mass of a stainless steel spacer plate formed with these dimensions is calculated according to Equation 1 as:

$$C_{th}=\rho V\mu=7.9 \text{ g/cm}^3*(44.9 \text{ cm}^2*0.284 \text{ cm})*0.50 \text{ (J/g° C.)}=50.3 \text{ J/° C.} \qquad \text{EQU. 3}$$

A heat flux rate of a stainless steel spacer plate formed with these dimensions is calculated according to Equation 2 as:

$$Q/t=kA/d*(T_2-T_1)=14 \text{ W/(m·K)}*(44.9 \text{ cm}^2/0.284 \text{ cm})*(T_2-T_1)=22(T_2-T_1) \qquad \text{EQU. 4}$$

Thus, referring to Table 3 and equations 3 and 4, a spacer plate (1100) formed according to an embodiment of the disclosed technology can transfer thermal energy at a rate (Q/t=553($T_2-T_1$)) that is approximately 25 times that of a spacer plate having a similar thermal mass formed using conventional SOFC stack materials (Q/t=22($T_2-T_1$)).

Referring to FIG. 4, an embodiment of HP-SOFC stack (4000) includes anode flow lining plate (4720), cathode flow lining plate (4730), and separator flow lining plate (4710) formed from an oxidation resistant alloy, for example Monel or Hastelloy, and disposed to protect thermal plates including anode flow plate (1200), cathode flow plate (1300), and spacer plate (1100) from oxidation. Referring to table 3, in an embodiment each of the lining plates (4710, 4720, and 4730) is configured with a thickness that is less than a thickness of any of the thermal plates and can each transfer thermal energy at a rate (Q/t approximately 800 ($T_2-T_1$)) that is approximately 1.4 times greater than a rate at which spacer plate (1100) can transfer thermal energy (Q/t=553). Thus, despite comprising material with a coefficient of thermal conductivity (k=26 W/m·K) that is less than a coefficient of thermal conductivity (k=401 W/m·K) of thermal plates (1100, 1200, 1300), lining plates (4710, 4720, and 4730) do not slow conductive heat transfer through HP-SOFC stack (4000) as compared to spacer plate (1100).

Referring to FIGS. 1, 3B, 4, and 7 and equation 2, an exemplary HP-SOFC fuel cell stack (7100) comprising HP-SOFC units (e.g. 1010, 3010, 4010) formed predominantly from copper has a length (d) from a first end (7102) to a second end (7104) and a cross sectional area (A). $T_1$ of equation 2 can refer to a normal stack operating temperature, for example a temperature of approximately 700° C., which can be further termed $T_{cold}$. $T_2$ of equation 2 can refer to a temperature of a hot location within HP-SOFC stack (7100), for example a portion of a thermal plate (1100, 1200, 1300) in thermal communication with a combusting gas leak (i.e. one or more of 1240-1248) or another location having an otherwise elevated temperature. $T_2$ can thus be termed $T_{hot}$. Equation 2 can thus be expressed as:

$$Q/t=kA/d(T_{hot}-T_{cold}) \qquad \text{EQU. 5}$$

To compare thermal characteristics of HP-SOFC stack (7100) comprising mostly copper to thermal characteristics of a conventional SOFC stack having length (d) and cross sectional area (A) substantially identical to that of HP-SOFC stack (7100), a thermal conductivity of HP-SOFC stack (7100) is approximated as thermal conductivity of copper ($k_c$) where $k_c$=401 W/(m·K) and a thermal conductivity of a conventional SOFC stack ($k_{cov}$) is approximated as either thermal conductivity of stainless steel ($k_{ss}$) or thermal conductivity of ceramic ($k_{cer}$) where $k_{ss}$=14 W/(m·K) and $k_{cer}$=12 W/(m·K). Assuming that A and d are the same for both stacks, Q/t for a conventional SOFC stack is less than Q/t for HP-SOFC stack (7100) as expressed in terms of Equation 5 as:

$$k_{cov}(T_{hot}-T_{cold})<k_c(T_{hot}-T_{cold}) \qquad \text{EQU 6}$$

Thus, for HP-SOFC stack (7100) temperature differential $T_{hot}-T_{cold}$ is 33 times smaller than $T_{hot}-T_{cold}$ for a stack formed predominant from ceramic components and is 28 smaller than $T_{hot}-T_{cold}$ for a stack formed predominant from stainless steel components. During operation of an SOFC stack, a small leak such as one or more of leaks (1240-1248) generates heat as mixed anode and cathode exhaust gases burn. If such a leak generates a temperature differential ($T_{hot}-T_{cold}$) of 100° C. in a conventional stack formed from convention materials (e.g. ceramic or stainless steel), a substantially similar leak generates a temperature differential of only approximately 3° C. in HP-SOFC stack (7100).

4.3.4 Vibrational, Mechanical, and Thermal Shock Protection

Referring to FIG. 3B, a single cell unit (3010) which is substantially similar to cell units (1010, 4010) includes planar anode supported SOFC (2100) supported and held in place at peripheral edges adjacent to spacer plate (1100) by compliant seals (1800). Flexible tabs (3535) of formed plate interconnects (3520, 3530) provide additional support to a central portion of SOFC (2100) within anode feed chamber (1420) and cathode feed chamber (1430).

Compliant seals (1800) are much less rigid than SOFC (2100) and conventional bonded seals. In an embodiment, SOFC (2100) has a modulus of elasticity of approximately 220 GPa and compliant seals (1800) are made from alumina felt or matted ceramic wool having a modulus of elasticity of approximately 0.3 MPa. Conventional rigid glass and glass/ceramic composite seals can have modulus of elasticity between 75 and 120 GPa or greater, depending on glass type and glass/ceramic composition.

In an embodiment, each compliant seal (1800) is compressed by between approximately 30 to 40 percent of initial seal thickness when HP-SOFC stack (1000, 3000, 4000) is assembled. For example, a compliant seal (1800) comprising a ceramic felt with an initial height of 0.125 inches is compressed to an assembled height of 0.08 inches, thereby compressing the seal by approximately 36% of an initial seal height to approximately 64% compression. In other words, each compressive seal is subjected to compressive strain of approximately 0.30 to 0.40 such that planar SOFC is subjected to approximately 0.09 to 0.12 MPa of compressive stress by compressive felt seals (1800) when HP-SOFC stack is assembled. Conventional compliant seals formed from ceramic felts or the like are compressed to more than 40 percent of initial seal thickness to obtain a substantially gas tight seal and may be impregnated with ceramic or glass fibers and precompressed in a hydraulic press. Compression of matted felts tends to consolidate and densify the loose fiber matrix of the felt which increases the effective stiffness of the material and may load the material beyond linear elastic limits of material strain. Conventional compliant seals thus include much less residual compliance when assembled in an SOFC stack as compared to compliant seals of the disclosed technology.

In an embodiment, formed plate interconnects (3520, 3530) are formed from copper, which has a modulus of elasticity of 101-103 GPa over a stack operating temperature range of 350° C. to 500° C. In an embodiment, a height of each formed plate interconnect (3520, 3530) is greater than a height of an anode or cathode feed chamber (1420, 1430) in which the interconnect is disposed and the interconnect height is reduced by approximately 5 to 95 percent, or 25 to 45 percent. In an exemplary, non-limiting embodiment interconnect height is reduced by approximately 30 percent, when HP-SOFC stack (3000) is assembled. That is, flexible tabs (3535) of each formed plate interconnect (3520, 3530) deflect in response to a compressive load applied to the flexible tabs when the stack is assembled. Under compressive load of approximately 30 pounds applied to seat the formed plate interconnects during stack assembly, flexible tabs (1735) flex such that formed plate interconnect (3520, 3530) is compressed approximately 30% per 30 pounds or 0.02 MPa of compressive load (i.e. formed plate interconnects (3520, 3530) each have an effective modulus of elasticity of approximately 0.10 MPa). A conventional SOFC interconnect formed from stainless steel can have a modulus of elasticity of approximately 205 GPa.

In a similar manner, mesh or foam interconnects (1520, 1530) deform under compressive loading to absorb stress caused by mechanical forces and thermal cycling. In an embodiment, mesh or foam interconnects (1520, 1530) each have an effective modulus of elasticity that is greater than an effective modulus of elasticity of formed plate interconnects (3520, 3530) and less than that interconnects formed from stainless steel.

Because compliant seals (1800) and interconnects (1520, 1530, 3520, 3530) are much less stiff that SOFCs (2000, 2100, 2200), the compliant seals and interconnects deform more readily than SOFCs such that vibrations and mechanical loads are effectively absorbed by the compliant seals and interconnects rather than being transferred to SOFCs. Further, SOFC (2000, 2100, 2100) are not held rigidly in place by compliant seals (1800) and interconnects (1520, 1530, 3520, 3530) such that HP-SOFC stack vibrations, shocks, and shear forces can be translated into SOFC motion without transferring large mechanical stresses to the SOFCs. The compliant seals (1800) and interconnects (1520, 1530, 3520, 3530) protect SOFC (2000, 2100, 2100) from structural damage due to mechanical stresses caused by vibrations and shocks or other disturbance to the HP-SOFC stack which may occur, for example, during transportation or other handling of HP-SOFC stack (1000, 4000).

Compliant seals (1800), flexible tabs (3535), and mesh or foam interconnects (1520, 1530) allow the metal walls of the SOFC chamber and the composite structure of SOFC (2000, 2100, 2200) to expand and contract in response to changing temperature without subjecting the SOFC (2000, 2100, 2200) to substantial stress or strain. The compliant seals (1800) and mesh or foam interconnects (1520, 1530) are configured to compress and expand and flexible tabs (3535) are configured to bend and flex under changing compressive loads caused by expansion and contraction of SOFC chamber walls and SOFC (2000, 2100, 2200) during thermal cycling without transferring substantial stress or strain to SOFC (2000, 2100, 2200).

During thermal cycling and thermal shock events, SOFCs that are bonded to conventional rigid glass and glass-ceramic seal materials can be subjected to shear stresses of approximately 145 MPa and maximum principal stresses of 20-25 MPa. However, because SOFC (2000, 2100, 2200) is not fixedly held in place by bonded seals, as is the case with glass and glass-ceramic sealing materials, surfaces of SOFC (2000, 2100, 2200) that are in contact with surfaces of flexible seals (1800), mesh or foam interconnects (1520, 1530), and flexible tabs (3535) can slide relative to each other during thermal cycling, thereby preventing or greatly reducing the magnitude of shear stress to which SOFCs (2000, 2100, 2200) are exposed.

4.3.5 Temperature Resistant Electrically Insulating Seals

Referring to FIGS. 1 and 4, an HP-SOFC stack includes a plurality of stack units (1020, 4020). Each stack unit includes a number of plates that are joined together, as will be discussed below. Multiple stack units are stacked to form the SOFC stack. A layer of temperature resistant electrically insulating material is disposed between stack units to form an electrical insulation layer (1850). The electrical insulation layer (1850) is disposed between a spacer plate (1100) of a first stack unit and an anode flow plate (1200) or anode flow lining plate (4720) of an adjacent stack unit. In an exemplary, non-limiting embodiment, the layer of temperature resistant electrically insulating material includes a mica seal e.g. a mica sheet comprising mica in a silicon binder, or the like. The electrical insulation layers (1850) are configured and disposed to prevent an anode and a cathode electrode of an SOFC from electrically shorting and to provide a gas seal for manifolds, passageways, and chambers formed by adjacent stacked stack units.

The electrical insulation layer (1850) may or may not form a gas-tight seal since the mica sheet material may include defects and or may not fully seat over the entire seal area; however, some leaking is expected. In practice, some anode gas will leak between the anode flow plate and the spacer plate of a cell unit and flow into an environment surrounding the SOFC stack, for example into the interior of an enclosure in which the stack is located. The anode gas then mixes with gas outside of the stack and ignites in region (1244). If cathode gas leaks past a compliant seal into an anode feed chamber, mixed anode and cathode gas can leak past the mica seal and out of the stack where it ignites. The thermal conductor components of the HP-SOFC stack absorb and rapidly conduct thermal energy generated by the combustion, as previously discussed.

Anode or cathode gas in corresponding anode and cathode gas manifolds can leak from one manifold to another past the layer of temperature resistant electrically insulating material. For example, anode gas can leak from the anode gas manifold into the cathode gas manifold and cathode gas can leak from the cathode gas manifold into the anode gas manifold. In either case, the anode and cathode gases mix together, auto-ignite (1246, 1248), and generate thermal energy at the location where they mix and ignite. The thermal conductor components of the HP-SOFC stack absorb and rapidly conduct thermal energy generated by the combustion, as previously discussed.

4.3.6 Square or Rectangular HP-SOFC Stack

Referring to FIGS. 1, 3, 4, and 5, in an exemplary, non-limiting embodiment, cells of the HP-SOFC are substantially quadrilateral, e.g. square or rectangular, planar SOFCs. Anode and cathode manifolds are located on a first side of the HP-SOFC stack and an exhaust gas manifold is located on an opposing second side of the stack. Anode and cathode gas flow across the SOFCs from the anode and cathode manifolds, respectively to the exhaust gas manifold. In further embodiments, anode and cathode manifolds are both located on the same side of the SOFC stack. The anode and cathode manifolds can be located on opposing sides, e.g., on front and back sides of the stack or on left or right sides on the stack or each of the anode and cathode gas manifolds can be located on adjacent sides of a stack, for example an anode gas manifold is located on a front face of a stack and a cathode gas manifold is located on a right side of the stack.

4.3.7 Square or Rectangular HP-SOFC Stack Operating Mode

Figure 5:
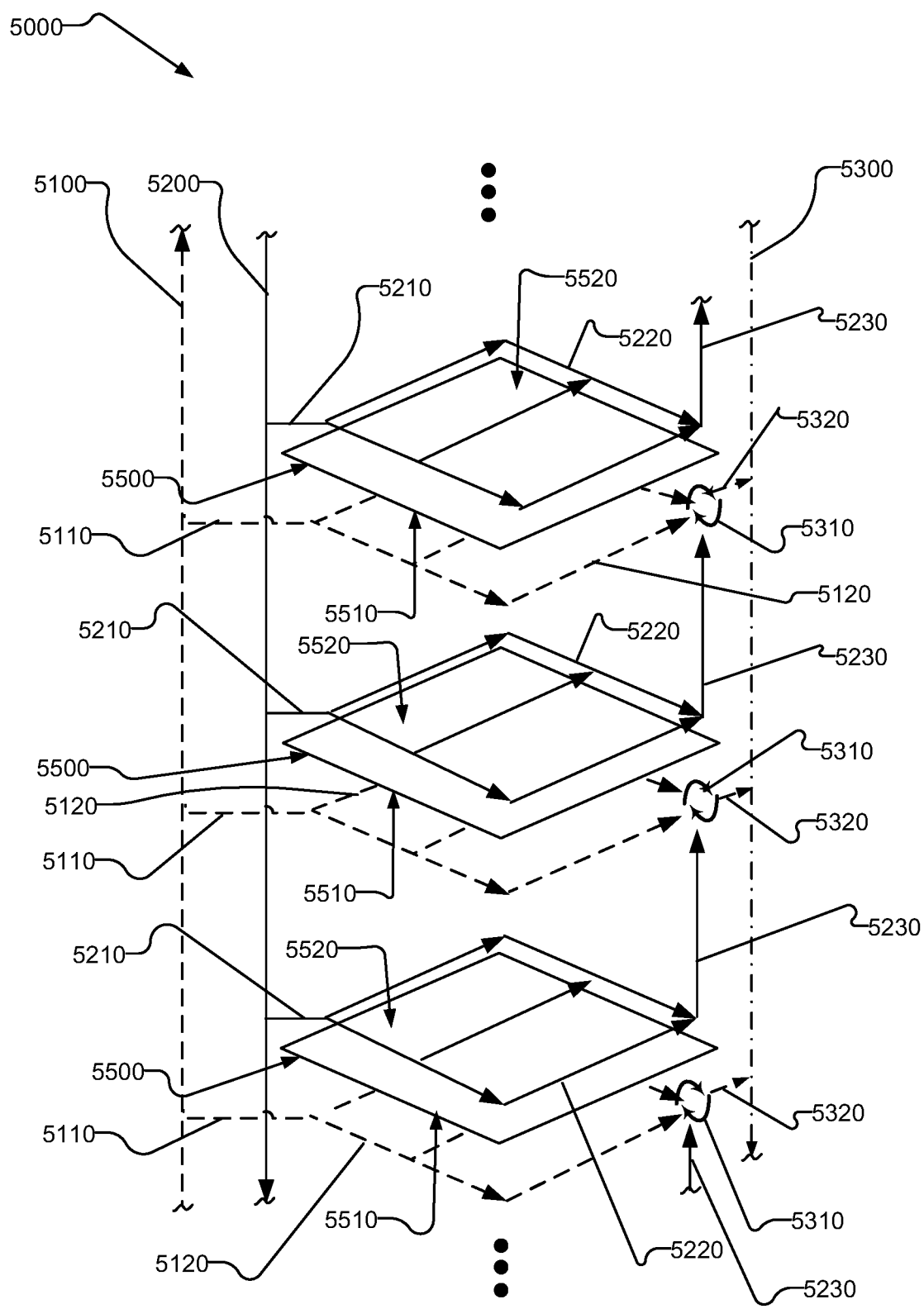
FIG. 5 depicts a schematic view of exemplary gas flow pathways of a solid oxide fuel cell stack assembly according to the present technology.

Referring to FIGS. 4 and 5, gas flow fields (5000) according to an exemplary operating mode of a substantially quadrilateral HP-SOFC stack (4000) are illustrated. Cathode manifold gas flow (5100) passes through a cathode manifold (1630) and therefrom into a cathode inlet passageway (1320) of cell unit (4010) as cathode inlet gas flow (5110). Cathode inlet gas flow (5110) traverse's cathode gas inlet passageway (1320) into cathode feed chamber (1430). The cathode gas flows across the cathode surface (5510) of SOFC (5500) as SOFC cathode surface gas flow (5120). The cathode gas flows out of the cathode feed chamber (1430) as cathode exhaust gas. The cathode exhaust gas flows through a cathode outlet passageway (1330) to an exhaust gas combustion chamber (1340), disposed within HP-SOFC stack (4000), wherein the cathode exhaust gas mixes with anode exhaust gas and becomes a component of mixed anode and cathode exhaust gas (1920, 5310).

Anode gas flows through an anode gas manifold (1620) and therefrom into an anode inlet passageway (1220) of a cell unit (4010) and therethrough to an anode feed chamber (1420). Anode manifold gas flow (5200) flows though anode gas manifold (1620) and enters anode gas inlet (1220). Anode gas flows through anode gas inlet passageway (1220) as anode inlet gas flow (5210) and therefrom into anode feed chamber (1420). The anode gas flows across the anode surface (5520) of SOFC (5500) as anode surface gas flow (5220). The anode gas flows out of the anode feed chamber (1420) as anode exhaust. Anode exhaust flows through anode outlet passageway (1230) and therethrough into exhaust gas combustion chamber (1340) as anode exhaust gas flow (5230). Anode exhaust gas mixes with cathode exhaust gas in exhaust gas combustion chamber (1340) to become a component of mixed anode and cathode exhaust gas (1920, 5310).

Mixed anode and cathode exhaust gas (1920, 5310) ignites and burns within exhaust gas combustion chamber (1340). Thermal energy generated by combustion of mixed anode and cathode exhaust gas flows (1920, 5310) is transferred to walls of exhaust gas combustion chamber (1340). The temperature of the walls of the exhaust gas combustion chamber (1340) are maintained at a temperature that is greater than the auto-ignition temperature of the mixed anode and cathode exhaust gas (1920, 5310) and the mixed exhaust gases auto-ignite within combustion chamber (1340) without requiring an ignitor to initiate combustion.

Combustion of mixed anode and cathode exhaust gases within exhaust gas combustion chamber (1340) generates combustion exhaust gas. Combustion exhaust gas flows, as combustion exhaust outlet gas flow (5320), through exhaust gas outlet passageway (1350) from exhaust gas combustion chamber (1340) to exhaust gas manifold (1650). The hot combustion exhaust gas passes through the stack within the exhaust manifold as combustion exhaust manifold gas flow (5300). Thermal energy is transferred from the combustion exhaust gas to the walls of the exhaust gas combustion chamber (1340) and is rapidly conducted through the cathode flow plate (1300) to adjacent stack plates of HP-SOFC stack (4000) and throughout the stack. Thermal energy is transferred between combustion exhaust manifold gas flow (5300) and the walls of exhaust gas manifold (1650), further transferring thermal energy throughout the HP-SOFC stack.

4.3.8 Circular HP-SOFC Stack

Figure 6:
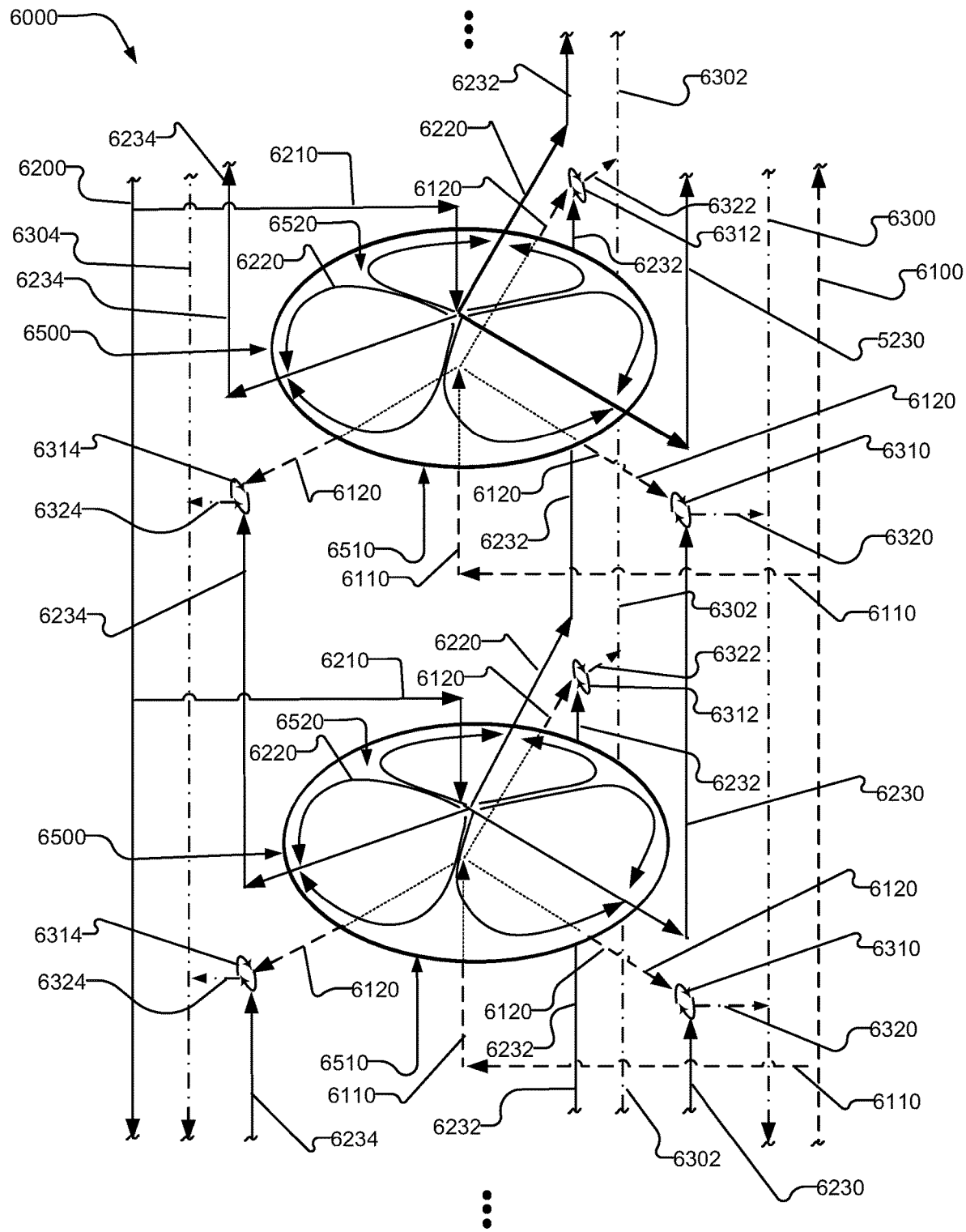
FIG. 6 depicts a schematic view of exemplary gas flow pathways of a solid oxide fuel cell stack assembly according to the present technology.

Referring to FIG. 6, gas flow fields (6000) according to an exemplary operating mode of an exemplary circular HP-SOFC stack (not shown) are illustrated. Cells of the circular HP-SOFC stack include substantially circular planar SOFCs and the circular HP-SOFC stack is substantially circular. A circular HP-SOFC stack can include one or more anode gas manifolds, one or more cathode gas manifolds, and one or more exhaust gas manifolds. The manifolds can include features formed in thermal conductor plates that comprise the circular HP-SOFC stack. Referring to FIG. 6, gas flow fields (6000) are illustrated for an exemplary embodiment of a circular HP-SOFC stack that includes one anode gas manifold, one cathode gas manifold, and three exhaust gas manifolds. In further embodiments, a circular HP-SOFC stack can include multiple anode and cathode gas manifolds, for example three anode gas manifolds, three cathode gas manifolds, and can include more than three exhaust gas manifolds. An exemplary embodiment of a circular HP-SOFC stack includes six exhaust gas manifolds, disposed near the perimeter of the stack and evenly spaced around the perimeter of the stack. More generally, a circular HP-SOFC stack includes at least one each of an anode gas manifold, cathode gas manifold, and exhaust gas manifold and can include more than one of each manifold to meet performance or other requirements, for example to achieve a specified pressure drop of an anode or cathode gas flow through the stack.

4.3.9 Circular HP-SOFC Stack Operating Mode

Referring to FIG. 6, gas flow fields (6000) according to an exemplary operating mode of a circular HP-SOFC stack are illustrated. Cathode manifold gas flow (6100) and cathode inlet gas flow (6110) deliver cathode gas to SOFC cathode surface gas flow (6120) which provides a flow of cathode gas across a cathode face (6510) of circular SOFC (6500). Cathode surface gas flow (6120) flows radially outward from a central portion of cathode face (6510) of circular SOFC (6500) towards an outer edge of cathode face (6510) where it becomes cathode exhaust flow and is mixed with anode exhaust as a component of mixed cathode and anode cathode exhaust (6310, 6312, 6314).

Anode manifold gas flow (6200) and anode inlet gas flow (6210) deliver anode gas to SOFC anode surface gas flow (6220) which provides a flow of anode gas across an anode face (6520) of circular SOFC (6500). Anode surface gas flow (6220) flows radially outward from a central portion of cathode face (6520) of circular SOFC (6500) towards an outer edge of anode face (6520) of circular SOFC (6500)

where it becomes anode exhaust flow (6230, 6232, 6234). Anode exhaust gas flow (6230, 6232, 6234) delivers anode exhaust gas to mixed cathode and anode cathode exhaust (6310, 6312, 6314).

Mixed anode and cathode exhaust gas (6310, 6312, 6314) each ignite and burn within one of three exhaust gas combustion chambers (not shown). Each exhaust gas combustion chamber is substantially similar to exhaust gas combustion chamber (1340) and is formed by features of one or more thermal conductor plates. Each exhaust gas combustion chamber comprises walls formed with material having a coefficient of thermal conductivity greater than 100 W/(m·K). Thermal energy generated by combustion of mixed anode and cathode exhaust gas (6310, 6312, 6314) is transferred to walls of the exhaust gas combustion chambers and is rapidly conducted through one or more thermal conductor plates comprising the exhaust gas combustion chambers (not shown) to thermal conductor plates of a circular HP-SOFC stack (not shown) and throughout the stack. The temperature of the walls of the exhaust gas combustion chambers are maintained at a temperature that is greater than the auto-ignition temperature of the mixed anode and cathode exhaust gas (6310, 6312, 6314) and the mixed exhaust gases auto-ignite within combustion chambers without requiring an ignitor to initiate combustion.

Combustion of mixed anode and cathode exhaust gases within exhaust gas combustion chambers generates hot combustion exhaust gas. Combustion exhaust gas flows, as combustion exhaust gas outlet flow (6320, 6322, 6324) to combustion exhaust manifold gas flows (6300, 6302, 6304). The hot combustion exhaust gas passes through the circular HP-SOFC stack within the exhaust manifolds as combustion exhaust manifold gas flows (6300, 6302, 6304). Thermal energy is transferred between combustion exhaust manifold gas flows (6300, 6302, 6304) and the walls of exhaust gas manifolds (not shown) through which the combustion exhaust gas flows pass, thereby transferring thermal additional energy throughout the circular HP-SOFC stack.

4.4 Method for Forming HP-SOFC Stack

An HP-SOFC stack is formed by stacking HP-SOFC plates one atop another while aligning manifold through holes of adjacent plates such that anode gas manifold through holes are aligned to form anode gas manifolds, cathode gas manifold through holes are aligned to form cathode gas manifolds, and exhaust gas manifold through holes are aligned to form exhaust gas manifolds.

Referring to FIG. 4, first stack unit (4020) is formed by stacking an anode flow lining plate (4720), a thermal conductor anode flow plate (1200), a separator lining plate (4710), a thermal conductor cathode flow plate (1300), a cathode flow lining plate (4730), and a thermal conductor spacer plate (1100) and joining the stacked plates together to form the stack unit (4010). In an exemplary, non-limiting, embodiment plates are brazed together. In further embodiments, stacks can be joined together using other known joining techniques including, for example transient liquid phase (TLP) bonding, diffusion bonding, and welding.

The annular walls (1110) of the thermal conductor spacer plate form walls of an annular cell cavity (1400) and a planar surface of the lining cathode flow plate (4730) forms a bottom wall of the annular cell cavity. A first annular compliant seal (1800) and cathode formed plate interconnect (3530) are placed within the cell cavity (1400) and a planar SOFC (2000) is placed within the cell cavity atop the first annular compliant seal with the cathode surface (2042) of the SOFC opposing the cathode formed plate interconnect (3530). A second annular compliant seal and an anode formed plate interconnect (3520) is placed in the annular SOFC cavity (1400), atop the planar SOFC (2000). A layer of temperature resistant electrically insulating material (1850) is stacked atop the spacer plate (1100).

A second stack unit (4020) is formed and is stacked atop the layer of temperature resistant electrically resistant material with the anode flow lining plate (4720) of the second stack unit opposing the thermal conductor spacer plate (1100) of the first stack unit. A planar SOFC, interconnects, and compliant seals are disposed within SOFC cavity of the second stack unit. In an embodiment, approximately 30 pounds of compressive force are applied to an assembly of multiple stack units (4020) to seat compliant seals (1800) and formed plate interconnects (1520, 1530), i.e. to compress the seals and interconnects from an as-formed height or thickness to an as-assembled height or thickness. Further stack units are formed and stacked, with layers of temperature resistant electrically insulating material separating the stack units and with SOFC and compliant seals disposed within an annular SOFC cavity of each stack unit. Further stack units can be added to the stack by repeating the process.

A cell unit (4010) of the stack includes an SOFC (2000), anode and cathode feed chambers (1420, 1430) and formed plate interconnects (3520, 3530) adjacent to the SOFC, and anode and cathode flow plates (1200, 1300) adjacent to anode and cathode feed chambers associated with the SOFC. A cell unit (4010) includes a cathode flow (1300) plate and spacer plate (1100) of a first stack unit (4020) and an anode flow plate (1200) of an adjacent second stack unit (4020). A layer of temperature resistant electrically insulating material (1850) disposed between the spacer plate (1100) and the anode flow plate (1200) prevents the anode and cathode electrodes of the cell unit from shorting out.

The HP-SOFC stack can include top and bottom stack plates (not shown) that each include passageways between manifolds and anode or cathode feed chambers. A top stack end plate includes a first passageway between an anode gas manifold to an anode feed chamber and a second passageway between the anode feed chamber to an exhaust manifold. A bottom stack end plate includes a first passageway between a cathode gas manifold and a cathode gas feed chamber and a second passageway between the cathode feed chamber and an exhaust gas manifold. Top and bottom end plates are each fabricated from a material having a coefficient of thermal conductivity greater than 100 W/(m·K) and each comprise a thermal mass sufficient to rapidly conduct thermal energy.

When a desired number of cell units have been assembled into a HP-SOFC stack, a top stack plate is stacked atop a first end of the stack, opposing the spacer plate and stacked atop the layer of temperature resistant electrically insulating material of the previous stack unit that was added to the stack. In an embodiment, an anode lining flow plate is interposed between the temperature resistant electrically insulating material and the top stack plate. A bottom plate is added to an opposing side of the stack. The stack is held together by a clamping force applied to the top and bottom end plates. In an embodiment, the top and bottom end plates are joined by torsion members configured and disposed to apply the compression force. In an embodiment, approximately 200 to 800 pounds of compression force is applied to an assembled stack.

Referring to FIG. 1, an embodiment of a HP-SOFC stack without lining plates is formed in a similar manner by stacking multiple stack units (1020) with a layer of heat resistant electrically insulating material (1850) disposed between stack units and with a SOFC disposed in a cell cavity of each stack unit. Each stack unit is formed by stacking and joining components of a stack unit (1020) comprising an anode flow plate (1200), a cathode flow plate (1300), and a spacer plate (1100) and stacking SOFC (2000), compliant seals (1800), and mesh or foam interconnects (1520, 1530) in cell cavity (1400).

Referring to FIG. 3B, an embodiment of a HP-SOFC stack with formed plate interconnects can be formed in a similar manner by stacking formed plate interconnects (3520, 3530) in place of mesh or foam interconnects (1520, 1530).

Embodiments of a HP-SOFC stack can be formed with any suitable planar SOFC in a similar manner, for example by stacking anode supported SOFCs (2100) or metal supported SOFCs (2200) in place of electrolyte supported SOFCs (2000).

4.5 HP-SOFC System

Figure 7:
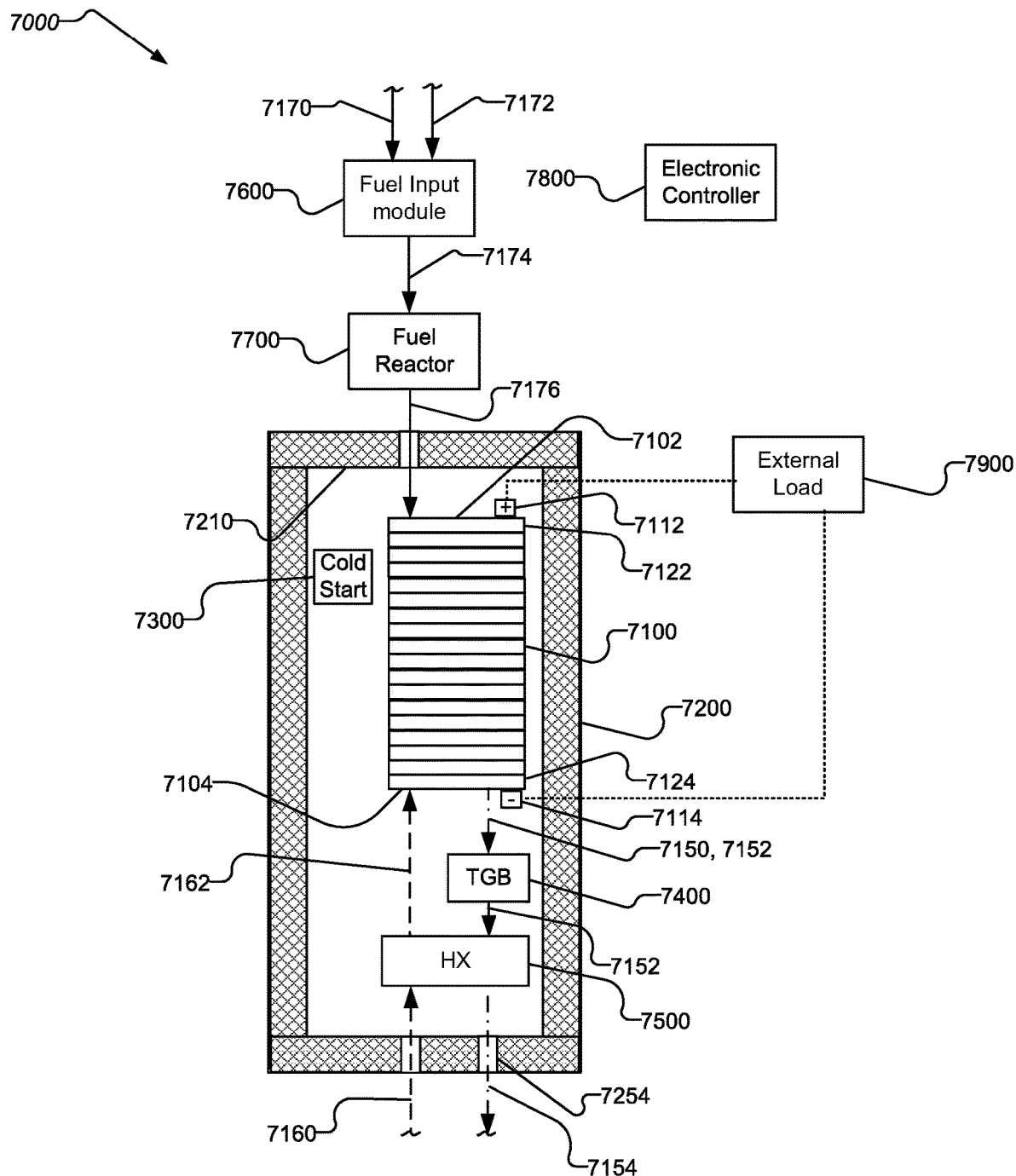
FIG. 7 depicts a schematic view of a non-limiting exemplary solid oxide fuel cell system according to the present technology.

Referring to FIG. 7, HP-SOFC system (7000) and external load (7900) are shown. HP-SOFC system (7000) includes HP-SOFC stack (7100). HP-SOFC stack (7100) includes a positive electrical terminal (7112) disposed at a first end (7102) of the stack and electrically coupled to a top stack plate (7122) and a negative electrical terminal (7114) disposed at second end (7104) of the stack opposing the first end (7102) of the stack and electrically coupled to a bottom stack plate (7124) for providing electric current generated by the stack to an external load (7900). Exemplary, non-limiting, examples of external load (7900) include a DC power consuming device or battery, a power grid such as a DC power grid or power sharing network, a power management device, and an AC inverter configured to convert a DC power signal from HP-SOFC stack (7100) to an AC power signal.

HP-SOFC stack (7100) is disposed within HP-SOFC stack enclosure (7200). HP-SOFC stack enclosure (7200) can include thermally insulated enclosure including thermal insulation (7210). In an exemplary, non-limiting embodiment, HP-SOFC stack enclosure (7200) includes a thermally conductive stack enclosure portion surrounding HP-SOFC stack (7100) wherein the thermally conductive stack enclosure portion is surrounded by a thermally insulated enclosure portion.

HP-SOFC system (7000) can optionally include a cold start module (7300), which can include a combustor to burn fuel (7170), fuel and oxidant mixture (7174) and/or anode fuel (7176), an electric resistance heater, or other suitable thermal energy source, disposed to provide thermal energy to raise a temperature of HP-SOFC stack (7100) to an operating temperature during a cold start process.

In an embodiment, HP-SOFC system (7000) includes an optional tail gas combustor (7400) for combusting any uncombusted fuel comprising SOFC stack exhaust gases (7150) from HP-SOFC stack (7100) to produce hot combusted SOFC stack exhaust gas (7152). In another embodiment, HP-SOFC system (7000) does not include a tail gas combustor and substantially all combustible components of mixed anode and cathode exhaust gases are combusted within HP-SOFC stack (7100), for example within exhaust gas combustion chambers (1340) such that gas exiting the SOFC stack predominantly comprises combusted SOFC stack exhaust gas (7152) and includes little or substantially no uncombusted fuel. SOFC system exhaust gases (7154) pass through HP-SOFC stack enclosure (7200) via an exhaust gas conduit (7254).

In an embodiment HP-SOFC system (7000) includes optional heat exchanger (7500), disposed to exchange thermal energy between combusted SOFC stack exhaust gases (7152) and inlet cathode gas (7160) to thereby warm the cool inlet cathode gas and produce warm cathode gas (7162) to supply HP-SOFC stack (7100). In an alternative embodiment, SOFC system (7000) does not include heat exchanger (7500) and inlet cathode gas (7160) is warmed by thermal energy transfer from walls of cathode gas manifold (1630) as the cathode gas passes through SOFC stack (7100).

HP-SOFC system (7000) includes fuel processing components including a fuel input module (7600) and fuel reactor (7700). Fuel input module (7600) is configured to control a flow rate of a hydrocarbon fuel (7170) and a flow rate of an oxidant (7172) which can include air or other oxygen containing gas or a mixture of gases. Fuel input module can include controllable valves, fuel pumps, oxidant pumps, blowers, or other oxidant and fuel pressure sources and volume or mass flow controllers. Fuel input module (7600) includes a mixer to mix fuel (7170) and oxidant (7172) and provide a mixture of fuel and oxidant (7174) to fuel reactor (7700). Fuel reactor (7700) is disposed to react fuel and oxidant mixture (7174) to produce an anode fuel (7176) which include a syngas or a mixture of gases including CO, $H_2$ and other reaction products. In an exemplary embodiment, fuel reactor (7700) includes a catalytic partial oxidation (CPDX) reactor. Fuel reactor (7700) can include a CPOX reactor, an auto-thermal reactor (ATR), a steam reformer, or a hybrid reformer including one or more of each of CPOX, ATR, and steam reformers. In an embodiment, HP-SOFC system (7000) is configured to use propane as fuel (7170). In further embodiments, HP-SOFC system (7000) is configured to use other hydrocarbon fuels (7170) including but not limited to liquid natural gas, kerosene, methane, or JP-6.

HP-SOFC system (7000) further includes an electronic controller (7800) configured to exchange signals including control signals and process parameter measurement signals with system components including fuel input module (7600), cold start module (7300), and temperature probes (not shown) disposed to measure a temperature of one or more of fuel reactor (7700), HP-SOFC stack (7100), tail gas combustor (7400), heat exchanger (7500), and HP-SOFC stack enclosure (7200). Electronic controller (7800) is configured to control operation of system components including, for example, fuel input module (7600) in response to process parameter measurement signals including but not limited to, for example, temperature of fuel reactor (7700), temperature of HP-SOFC stack (7100), and a measured or reported power draw of external load (7900).

HP-SOFC system (7000) optionally further includes cooling means (not shown) such as a fan or blower disposed to provide air flow over the exterior of the HP-SOFC stack enclosure (7200).

HP-SOFC system (7000) includes temperature sensors (not shown) to monitor a temperature of system components including HP-SOFC stack (7100), fuel reactor (7700) and HP-SOFC stack enclosure (7200) and to communicate signals including temperature data inputs to electronic controller (7800). Electronic controller (7800) uses temperature data communicated by the temperature sensors as inputs to control algorithms for controlling system operating parameters including operation of the cooling means and control of software controlled system shutdown.

The HP SOFC system (7000) can further include an outer enclosure (not shown) comprising a material having a high coefficient of thermal conductivity and a thermal fuse (not shown), disposed on the thermally conductive outer enclosure and configured to shut down an input of fuel (7170) responsive to the thermal fuse reaching a threshold temperature.

4.6 Stack Electrical Current

Referring to FIG. 7, HP-SOFC stack (7100) includes a positive electrical terminal (7112) disposed on a first end (7102) of the stack and a negative electrical terminal (7114) disposed on a second end (7104) of the stack, the second end of the stack opposing the first end the stack. The positive and negative terminals (7112, 7114) are configured to connect the stack to an external load (7900). The SOFCs of HP-SOFC stack (7100) are electrically connected together in series and are electrically connected to the positive and negative electric terminals (7112, 7114). Referring to FIG. 4, HP-SOFC stack (4000), which comprises an embodiment of HP-SOFC stack (7100) includes layers of temperature resistant electrically insulating material (1850) disposed to prevent SOFCs (2100) from electrically shorting.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. a solid oxide fuel cell unit cell and an SOFC stack of unit cells), those skilled in the art will recognize that its usefulness is not limited thereto and that the present invention can be beneficially utilized in any number of environments and implementations where it is desirable to more efficiently manage thermal energy distribution by thermal conduction. Accordingly, the claims set forth below should be construed in view of the full breadth and spirit of the invention as disclosed herein.

What is claimed is:

1. A planar SOFC cell unit comprising:
   a substantially planar spacer plate formed to enclose an open-ended cell chamber;
   a planar solid oxide fuel cell, supported inside the cell chamber, configured for electro-chemical energy generation while operating at an SOFC operating temperature;
   a substantially planar anode flow plate disposed adjacent to the spacer plate and opposed to an anode surface of the solid oxide fuel cell, wherein a planar surface of the substantially planar anode flow plate extends entirely over a first open end of the open-ended chamber; a substantially planar cathode flow plate disposed adjacent to the spacer plate and opposed a cathode surface of the solid oxide fuel cell,
   wherein a planar surface of the substantially planar cathode flow plate extends entirely over a second open end of the open-ended chamber; wherein each of the substantially planar spacer plate and the substantially planar cathode plate are thermally conductively coupled to each other across a planar boundary formed therebetween and together form a first substantially solid volume of plate material formed as a substantially continuous thermally conductive pathway extending from boundary surfaces of the cell chamber that are formed by the spacer plate and the cathode feed plate to outer perimeter edges of the first substantially solid volume; and, wherein the first substantially solid volume comprises one or more materials each having a coefficient of thermal conductivity of 100 W/mK or more.

2. The planar SOFC cell unit of claim 1 wherein the first substantially solid volume comprises sufficient thermal mass to maintain the first substantially solid volume at a substantially constant temperature that is less than the SOFC operating temperature.

3. The planar SOFC cell unit of claim 1 wherein the first substantially solid volume comprises sufficient thermal mass to maintain the first substantially solid volume at 1000° C. or less over an SOFC operating temperature range of 600 to 1200° C.

4. The planar SOFC cell unit of claim 3 wherein the first substantially solid volume comprises copper having a coefficient of thermal conductivity of 330 W/mK or greater.

5. The planar SOFC cell unit of claim 1 wherein the first substantially solid volume comprises sufficient thermal mass to maintain the first substantially solid volume at 500° C. or less over an SOFC operating temperature range of 350 to 550° C.

6. The planar SOFC cell unit of claim 5 wherein the first substantially solid volume comprises aluminum having a coefficient of thermal conductivity of 165 W/mK or greater.

7. The planar SOFC cell unit of claim 1 wherein the planar solid oxide fuel cell comprises a planar solid electrolyte layer sandwiched between a planar solid anode electrode layer and a planar solid cathode electrode layer wherein each of the planar solid electrolyte layer and the planar solid cathode layer is in mating contact with opposing surfaces of the planar solid electrolyte layer.

8. The planar SOFC cell unit of claim 1 wherein the planar solid oxide fuel cell is compliantly supported inside the cell unit.

9. The planar SOFC cell unit of claim 1 wherein the cell chamber comprises:
   an anode gas feed chamber, bounded by an anode electrolyte surface layer supported by the planar solid oxide fuel cell and by a surface of the substantially planar anode flow plate; a cathode gas feed chamber bounded by a cathode electrolyte surface layer supported by the planar solid oxide fuel cell and by a surface of the substantially planar cathode flow plate; an anode gas inlet channel extending from an anode gas manifold for delivering an anode gas flow into the anode gas feed chamber;
   a cathode gas inlet channel extending from a cathode gas manifold for delivering a cathode gas flow into the cathode gas feed chamber;
   an anode gas outlet passageway extending from the anode gas feed chamber to an exhaust gas manifold for removing the flow of anode gas from the anode gas feed chamber;
   a cathode gas outlet passageway extending from the cathode gas feed chamber to the exhaust gas manifold for removing the flow of cathode gas from the anode gas feed chamber,
   wherein each of the anode gas inlet channel, anode gas manifold, the anode gas outlet passageway, the cathode inlet channel, the cathode gas manifold, the cathode gas outlet passageway and the exhaust gas manifold pass through the first solid volume and the substantially planar anode gas feed plate.

10. The planar SOFC cell unit of claim 9 further comprising an exhaust gas combustion chamber, formed inside the substantially planar cathode flow plate wherein the exhaust gas combustion chamber is in fluid communication with each of the cathode gas outlet passageway of a first cell unit, the anode gas outlet passageway of a second cell unit and the exhaust gas manifold, wherein the exhaust gas combustion chamber receives the flow of cathode gas from the first unit cell and the flow of anode gas from the second unit cell.

11. The planar SOFC cell unit of claim 9 further comprising:
  a first compliant annular seal element, disposed inside the anode gas feed chamber between the substantially planar anode gas feed plate and the planar solid oxide fuel cell and formed to seal a perimeter edge of the anode gas feed chamber;
  a second compliant annular seal element, disposed inside the cathode gas feed chamber between the substantially planar cathode gas feed plate and the planar solid oxide fuel cell and formed to seal a perimeter edge of the cathode gas feed chamber;
  wherein each of the first and second compliant seal elements support the planar solid oxide fuel inside the cell chamber without contact between surfaces of the planar SOFC unit cell and surfaces of the cell chamber.

12. The planar SOFC cell unit of claim 11 wherein each of the first and second compliant seal elements comprises a compliant non-woven fabric comprising matted ceramic wool having a modulus of elasticity of 0.3 MPa or less.

13. The planar SOFC cell unit of claim 9 further comprising:
  a first compliant interconnect element disposed inside the anode feed chamber between the substantially planar anode flow plate and the anode electrolyte surface layer, wherein the first complaint element is configured to apply a compressive force directed orthogonal to the anode electrolyte surface layer and is further configured to provide an electrically and thermally conductive pathway extending from the anode electrolyte surface layer to the substantially planar anode flow plate;
  a second complaint interconnect element disposed inside the cathode feed chamber between the substantially planar cathode flow plate and the cathode electrolyte surface layer, wherein the second complaint element is configured to apply a compressive force directed orthogonal to the cathode electrolyte surface layer and is further configured to provide an electrically and thermally conductive pathway extending from the cathode electrolyte surface layer to the substantially cathode anode flow plate.

14. The planar SOFC cell unit of claim 13 wherein each of the first and second compliant interconnect elements are substantially identical and each comprises one of a porous mesh and a porous foam comprising copper.

15. The planar SOFC cell unit of claim 13 wherein each of the first and second compliant interconnects comprise a formed metal element formed from a planar metal sheet having a thickness of 0.002 to 0.09 inches and formed to include a planar base portion and a plurality of flexible tabs portions extending from the base portion, wherein the formed metal element comprises copper.

16. A planar SOFC stack comprising:
  a plurality of the planar SOFC cell units of claim 13 stacked one above another:
  an electrical insulation layer disposed between each substantially planar spacer plate and the substantially planar anode plate positioned adjacent thereto;
  a first electrical terminal connected in series to the planar cathode feed plate of each unit cell; and,
  a second electrical terminal connected in series to the planar anode plate of each unit cell.

17. The planar SOFC stack of claim 16 further comprising:
  a first substantially planer liner plate disposed in mating contact with a first planar surface of each substantially planar anode feed plate in the planar SOFC stack;
  a second substantially planer liner plate disposed in mating contact with a second, planar surface of each substantially planar anode feed plate in the planar SOFC stack between the substantially planar anode feed plate and the substantially planar spacer plate corresponding therewith; and,
  a third substantially planer liner plate disposed in mating contact with a first planar surface of each substantially planar cathode feed plate in the planar SOFC stack between the substantially planar cathode feed plate and the substantially planar spacer plate corresponding therewith;
  wherein each of the first, the second and the third substantially planer liner plates comprises a high temperature oxidation resistant alloy comprising nickel and copper or comprising nickel, molybdenum, chromium and iron.

* * * * *